United States Patent [19]

Shimura et al.

[11] Patent Number: 4,835,386
[45] Date of Patent: May 30, 1989

[54] RADIATION IMAGE RECORDING AND READ-OUT APPARATUS

[75] Inventors: Kazuo Shimura; Nobufumi Mori; Shigeru Saotome; Ryoichi Yoshimura; Hideo Watanabe; Yuichi Hosoi, all of Kaisei, Japan

[73] Assignee: Fuji Photo Film Co., Ltd., Kanagawa, Japan

[21] Appl. No.: 919,689

[22] Filed: Oct. 16, 1986

[30] Foreign Application Priority Data

Oct. 18, 1985 [JP] Japan .................. 60-232514
Oct. 18, 1985 [JP] Japan .................. 60-232515
Oct. 18, 1985 [JP] Japan .................. 60-232518
Oct. 19, 1985 [JP] Japan .................. 60-232304
Oct. 19, 1985 [JP] Japan .................. 60-234187

[51] Int. Cl.⁴ .................................. G03B 42/02
[52] U.S. Cl. ......................... 250/327.2; 250/484.1
[58] Field of Search .................. 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,394,581 | 7/1983 | Takahashi et al. | 250/484.1 |
| 4,400,619 | 8/1983 | Kotera et al. | 250/327.2 |
| 4,485,304 | 11/1984 | Teraoka et al. | 250/327.2 |
| 4,543,479 | 9/1985 | Kato | 250/327.2 |
| 4,603,253 | 7/1986 | Nakagawa | 250/327.2 |
| 4,651,220 | 3/1987 | Hosoi et al. | 358/256 |

Primary Examiner—Janice A. Howell
Assistant Examiner—Constantine Hannaher
Attorney, Agent, or Firm—Gerald J. Ferguson, Jr.

[57] ABSTRACT

A radiation image recording and read-out apparatus comprises a case housing a stimulable phosphor sheet and having an opening, a light shielding cover housed in the case for projection therefrom through the opening, a recording section for exposing the stimulable phosphor sheet disposed at an exposure position in the light shielding cover projected out of the case to radiation, and a read-out section having a sub-scanning system for moving the stimulable phosphor sheet between the exposure position and a position in the case. Or, the apparatus comprises a case having an opening for passing the stimulable phosphor sheet therethrough, a recording section for exposing the stimulable phosphor sheet disposed at the exposure position in the case to radiation, and a read-out section having a sub-scanning system for moving the stimulable phosphor sheet between the exposure position and a position projected out of the case. Alternatively, the apparatus comprises a sheet feed system for reciprocating a strip-like flexible stimulable phosphor sheet between first and second wind-up shafts, and a recording section for exposing the stimulable phosphor sheet disposed between the first and second wind-up shafts to radiation.

14 Claims, 16 Drawing Sheets

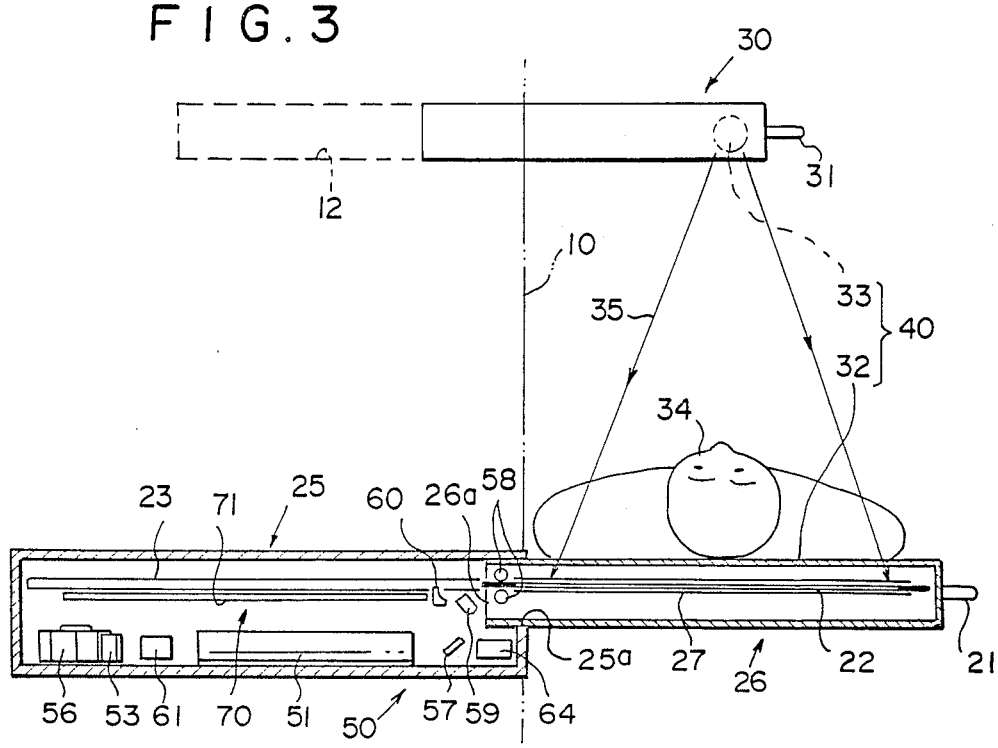
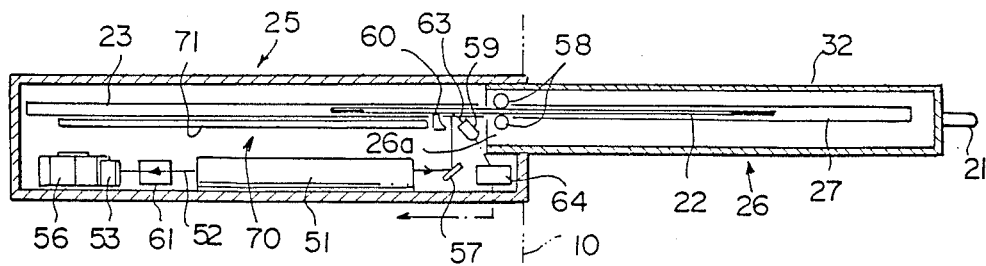
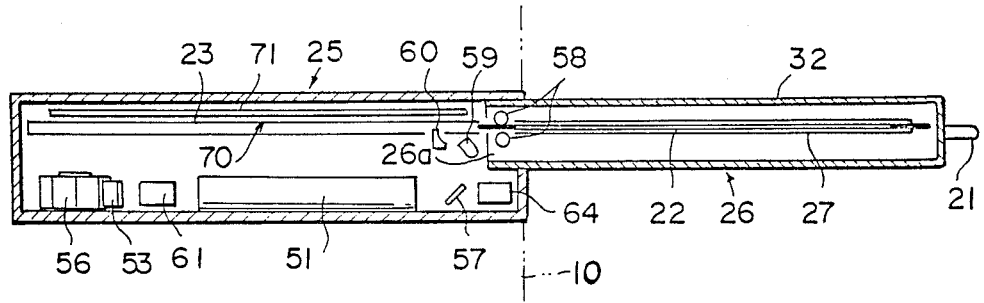

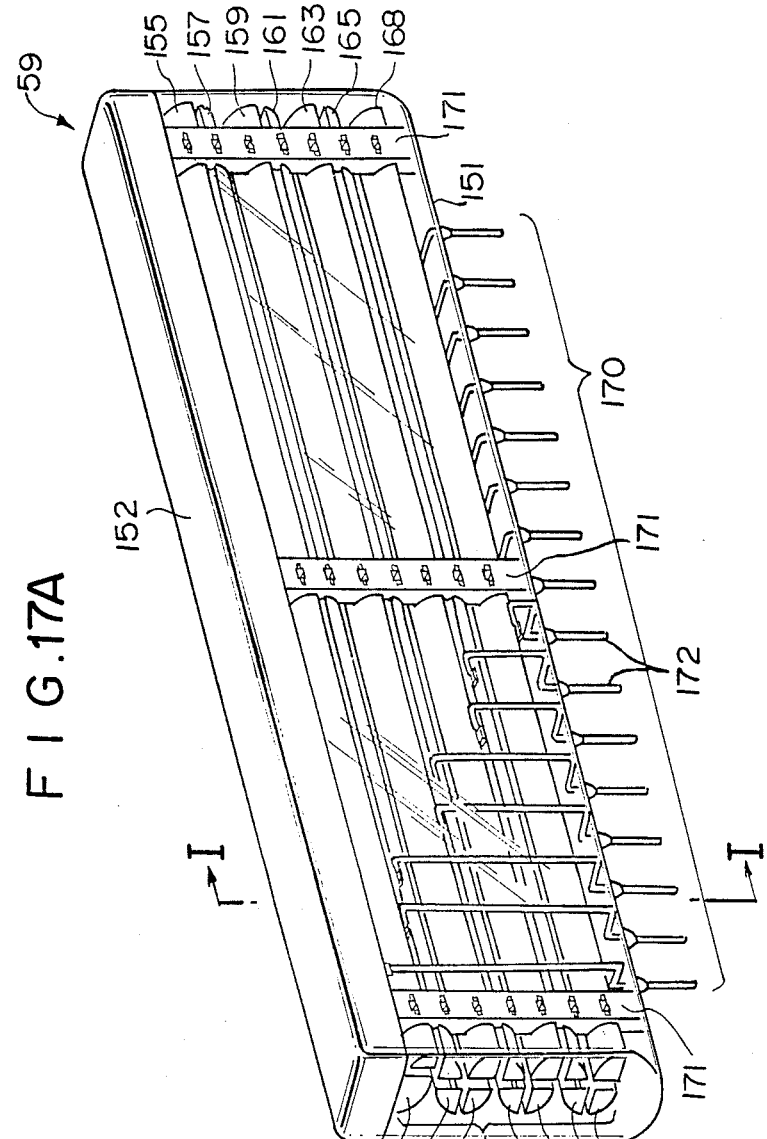
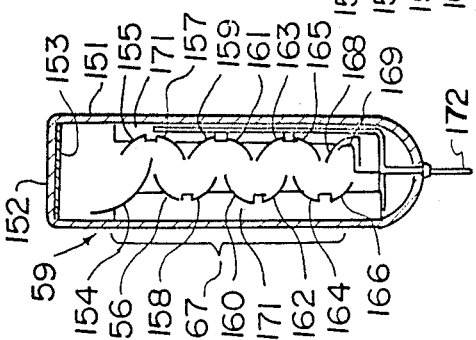

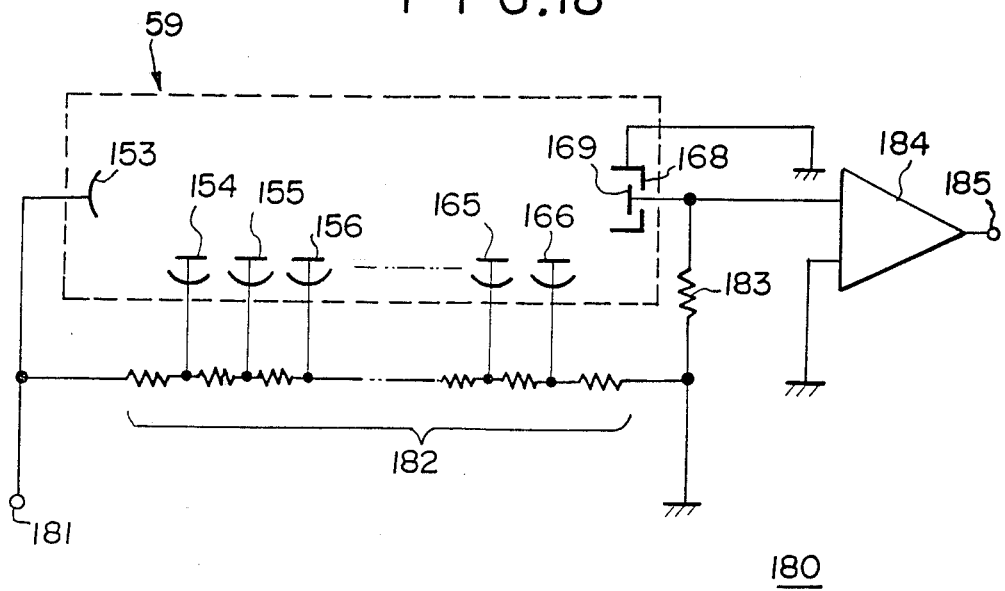
F I G.18

RADIATION IMAGE RECORDING AND READ-OUT APPARATUS

BACKGROUND OF THE INVENTION

1. Field of the Invention

This invention relates to a radiation image recording and read-out apparatus for exposing a stimulable phosphor sheet to a radiation passing through an object to have a radiation image of the object stored thereon, exposing the stimulable phosphor sheet to stimulating rays which cause it to emit light in proportion to the stored radiation energy, and detecting the emitted light and converting it into an electric signal. This invention particularly relates to a radiation image recording and read-out apparatus in which the stimulable phosphor sheet is used repeatedly. This invention also relates to a radiation image storage panel for use in the radiation image recording and read-out apparatus, and a method of moving the radiation image storage panel.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor (hereinafter referred to as a stimulable phosphor sheet or simply as a sheet) is first exposed to a radiation passing through an object to have a radiation image stored thereon, and is then scanned with stimulating rays which cause it to emit light in proportion to the stored radiation energy. The light emitted by the stimulable phosphor sheet when the sheet is exposed to the stimulating rays is photoelectrically detected and converted into an electric image signal, which is processed as desired to reproduce a visible image having an improved image quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, store the radiation images of the respective objects on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

In order to reuse stimulable phosphor sheets as described above, the radiation energy remaining on the stimulable phosphor sheet after it is scanned with stimulating rays to read out the radiation image stored thereon should be erased by exposure to light or heat as described, for example, in U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed in Japanese Unexamined Patent Publication No. 59(1984)-192240 a built-in type radiation image recording and read-out apparatus comprising:

i. a circulation and conveyance means for conveying at least one stimulable phosphor sheet for recording a radiation image thereon along a predetermined circulation path, ii. an image recording section positioned on said circulation path for recording a radiation image of an object on said stimulable phosphor sheet by exposing said stimulable phosphor sheet to a radiation passing through said object, iii. an image read-out section positioned on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned with said stimulating rays to obtain an electric image signal, and iv. an erasing section positioned on said circulation path for, prior to the next image recording on said stimulable phosphor sheet for which the image read-out has been conducted at said image read-out section, having said stimulable phosphor sheet release the radiation energy remaining on said stimulable phosphor sheet, whereby said stimulable phosphor sheet is circulated through said image recording section, said image read-out section and said erasing section and reused for radiation image recording.

In the aforesaid radiation image recording and read-out apparatus, recording and read-out of radiation images can be conducted continuously and efficiently.

However, the aforesaid radiation image recording and read-out apparatus has the drawback that, since the circulation path for the stimulable phosphor sheet is provided in the apparatus, the apparatus becomes large.

SUMMARY OF THE INVENTION

The primary object of the present invention is to provide a radiation image recording and read-out apparatus which is very small and in which a stimulable phosphor sheet is used repeatedly.

Another object of the present invention is to provide a radiation image recording and read-out apparatus which is small and provided with a simple mechanism for feeding a stimulable phosphor sheet and in which the stimulable phosphor sheet is used repeatedly and image recording is conducted continuously.

A further object of the present invention is to provide a radiation image recording and read-out apparatus which is small and free from a deviation in position of the stimulable phosphor sheet in the course of conducting image recording, image read-out and erasing, thereby providing a radiation image having an improved image quality, particularly a high diagnostic efficiency and accuracy.

A still further object of the present invention is to provide a radiation image storage panel suitable for use in the small radiation image recording and read-out apparatus.

The specific object of the present invention is to provide a method of moving the radiation image storage panel in the radiation image recording and read-out apparatus.

The present invention provides a radiation image recording and read-out apparatus which comprises:

i. a case housing a stimulable phosphor sheet for storing a radiation image thereon, and provided with an opening at one end portion, ii. a light shielding cover housed in said case for projection out of said case through said opening, and provided with a sheet passage opening at an end portion on the side supported by said case at the time of projection out of said case, iii. an image recording section for exposing said stimulable phosphor sheet, which is disposed at an exposure position inside of said light shielding cover projected out of said case, to a radiation carrying image information to have the radiation image stored on said stimulable phosphor sheet, iv. an image read-out section provided with a sub-scanning means for moving said stimulable phosphor sheet between said exposure position and a position to which said stimulable phosphor sheet advances through said sheet passage opening into said case, and a main scanning means for scanning said stimulable phosphor sheet with stimulating rays in a main scanning direction in the vicinity of said opening of said case inside of said case, wherein said stimulable phosphor sheet carrying said radiation image stored thereon is exposed to the stimulating rays which cause said stimulable phosphor sheet to emit light in proportion to the stored radiation energy, and the emitted light is read out by a photoelectric read-out means to obtain an image signal, and v. an erasing section for releasing radiation energy remaining on said stimulable phosphor sheet, for which the image read-out has been conducted at said image read-out section, before image recording is conducted on said stimulable phosphor sheet.

The present invention also provides a radiation image recording and read-out apparatus which comprises:

i. a case housing a stimulable phosphor sheet for storing a radiation image thereon, and provided with an opening for allowing passage of said stimulable phosphor sheet therethrough at one end portion, ii. an image recording section for exposing said stimulable phosphor sheet, which is disposed at an exposure position inside of said case, to a radiation carrying image information to have the radiation image stored on said stimulable phosphor sheet, iii. an image read-out section provided with a sub-scanning means for moving said stimulable phosphor sheet between said exposure position and a position to which said stimulable phosphor sheet is projected out of said case through said opening, and a main scanning means for scanning said stimulable phosphor sheet with stimulating rays in a main scanning direction in the vicinity of said opening inside of said case, wherein said stimulable phosphor sheet carrying said radiation image stored thereon is exposed to the stimulating rays which cause said stimulable phosphor sheet to emit light in proportion to the stored radiation energy, and the emitted light is read out by a photoelectric read-out means to obtain an image signal, and iv. an erasing section for releasing radiation energy remaining on said stimulable phosphor sheet, for which the image read-out has been conducted at said image read-out section, before image recording is conducted on said stimulable phosphor sheet.

The present invention further provides a radiation image recording and read-out apparatus which comprises:

i. a first wind-up shaft for winding one end side of a strip-like flexible stimulable phosphor sheet for storing a radiation image thereon, ii. a second wind-up shaft disposed in spaced relation to said first wind-up shaft for winding the other end side of said stimulable phosphor sheet, iii. a sheet feed means for reciprocating said stimulable phosphor sheet between said first wind-up shaft and said second wind-up shaft, iv. an image recording section for exposing said stimulable phosphor sheet, which is positioned between said first wind-up shaft and said second wind-up shaft, to a radiation carrying image information to have the radiation image stored on said stimulable phosphor sheet, v. an image read-out section for exposing said stimulable phosphor sheet carrying said radiation image stored thereon to stimulating rays which are emitted by a stimulating ray irradiation means and which cause said stimulable phosphor sheet to emit light in proportion to the stored radiation energy, and reading out the emitted light by a photoelectric read-out means to obtain an image signal, and vi. an erasing section for releasing radiation energy remaining on said stimulable phosphor sheet, for which the image read-out has been conducted at said image read-out section, before image recording is conducted on said stimulable phosphor sheet.

The present invention also provides a radiation image recording and read-out apparatus for positioning a stimulable phosphor sheet at an exposure position where said stimulable phosphor sheet is exposed to a radiation carrying image information, exposing said stimulable phosphor sheet to the radiation to have a radiation image stored thereon, reciprocably conveying said stimulable phosphor sheet in one direction from said exposure position, and reading out said radiation image stored o said stimulable phosphor sheet in the course of said reciprocable conveyance, wherein the improvement comprises constituting the conveyance means, which is used for conveying and positioning said stimulable phosphor sheet at said exposure position and then reciprocably conveying said stimulable phosphor sheet in one direction, by a pair of nip rollers.

The present invention further provides a radiation image storage panel comprising a substrate, and a stimulable phosphor layer overlaid on said substrate and containing a binder and a stimulable phosphor dispersed therein, wherein the improvement comprises the provision of a flexible extension formed of a flexible material at a leading end portion and/or a rear end portion as viewed in a movement direction of said radiation image storage panel.

The present invention also provides a method of moving a radiation image storage panel, which comprises the steps of:

i. grasping a flexible extension of said radiation image storage panel by at least one pair of rolls, said radiation image storage panel comprising a substrate, and a stimulable phosphor layer overlaid on said substrate and containing a binder and a stimulable phosphor dispersed therein, and provided with said flexible extension formed of a flexible material at a leading end portion and/or a rear end portion as viewed in a movement direction of said radiation image storage panel, and ii. rotating said rolls to move said radiation image storage panel.

With the first mentioned radiation image recording and read-out apparatus and the second mentioned radiation image recording and read-out apparatus in accordance with the present invention, since the stimulable phosphor sheet is moved for sub-scanning with stimulating rays between the case and the light shielding cover projected out of the case, or is projected out of the case in the course of the image read-out, it is not necessary to provide a space for conveying the stimulable phosphor sheet for sub-scanning with stimulating rays inside of the case, and it is possible to make the apparatus very small. Therefore, the radiation image recording and read-out apparatus of the present invention is suitable also for use in a mobile X-ray diagnostic station, a ship, a submarine boat or the like wherein it is not always possible to ensure a large space for loading a medical diagnosis apparatus or the like. The present invention is very advantageous for medical diagnosis or the like in that radiation image recording becomes possible eve at a place where it has heretofore been impossible.

In the first mentioned radiation image recording and read-out apparatus in accordance with the present invention, when the radiation image stored on the stimulable phosphor sheet is read out at the image read-out section provided with the sub-scanning means and the main scanning means, the stimulable phosphor sheet is moved from the light shielding cover projected out of the case into the case. Or, in the case where image read-out is conducted after returning the stimulable phosphor sheet, the stimulable phosphor sheet is moved for image read-out from the case into the light shielding cover projected out of the case. Thus the sheet movement space for the sub-scanning is ensured by projecting the light shielding cover out of the case. Therefore, it is only necessary that the size of the case be such that the light shielding cover and the stimulable phosphor sheet can be housed therein when the apparatus is not used, and it is possible to make the case small, approximately to a size for housing a single stimulable phosphor sheet.

In the second mentioned radiation image recording and read-out apparatus in accordance with the present invention, when the image read-out is conducted at the image read-out section, the stimulable phosphor sheet is projected out of the case, or moved from the position projecting out of the case into the case. Since the space outside of the case is utilized as the sheet movement space for sub-scanning, it is possible to minimize the size of the case to approximately a size for housing a single stimulable phosphor sheet.

With the third mentioned radiation image recording and read-out apparatus in accordance with the present invention, since the stimulable phosphor sheet is used repeatedly inside of the apparatus, radiation image recording is conducted very economically. Further, since the flexible stimulable phosphor sheet is stored inside of the apparatus in a wound-up form and conveyed by winding and unwinding, it is possible to make the sheet feed mechanism very simple and small. Also, it is possible to house a stimulable phosphor sheet of a substantial length in the apparatus even though the apparatus is fabricated for smallness, and therefore to quickly conduct continuous image recording.

With the fourth mentioned radiation image recording and read-out apparatus in accordance with the present invention, since the stimulable phosphor sheet is conveyed and positioned by being grasped between a pair of rollers in the course of image recording and read-out, no deviation in position of the stimulable phosphor sheet arises during sheet conveyance, and no shock causing deviation arises. Therefore, it is possible to conduct image recording and read-out accurately through consistent movement of the stimulable phosphor sheet. Also, the apparatus becomes very small and cheap.

With the radiation image storage panel and the method of moving it in accordance with the present invention, since a means for engaging with the movement means is added to the ordinary radiation image storage panel (stimulable phosphor sheet), it is possible to efficiently utilize approximately the entire surface of the stimulable phosphor layer of the panel for radiation image recording. Also, since the radiation image storage panel in accordance with the present invention is moved by engagement with the panel movement means disposed inside of the radiation image recording and read-out apparatus, it is, for example, possible to move the panel with just a pair of rolls without using a complicated conveyance means such as a conveyor belt. Further, since the extension of the panel is formed of a flexible material, the extension may be deformed, for example, bent, when it is not in a state of engagement with the panel movement means such as rolls. Accordingly, it becomes possible to make the panel housing space small as compared with the surface area on one side of the panel, and consequently to minimize the size of the apparatus. Also, since the flexible extension acts in the same manner as a cushioning member for absorbing shock arising at the time of collisions with the conveyance system or surrounding walls, the panel is not affected by such shock. The combination of the radiation image storage panel having the flexible extension with a pair of rolls also facilitates movement of the radiation image storage panel.

BRIEF DESCRIPTION OF THE DRAWINGS

FIGS. 5 to 10 are sectional side views showing a part of further embodiments of the radiation image recording and read-out apparatus in accordance with the present invention, FIG. 17A is a perspective view showing the long photomultiplier used in the radiation image recording and read-out apparatus of the present invention, FIG. 17B is a sectional view taken along line I—I of FIG. 17A, FIG. 18 is a circuit diagram showing the drive circuit of the photomultiplier shown in FIG. 17A.

DESCRIPTION OF THE PREFERRED EMBODIMENTS

The present invention will hereinbelow be described in further detail with reference to the accompanying drawings.

Figure 1:
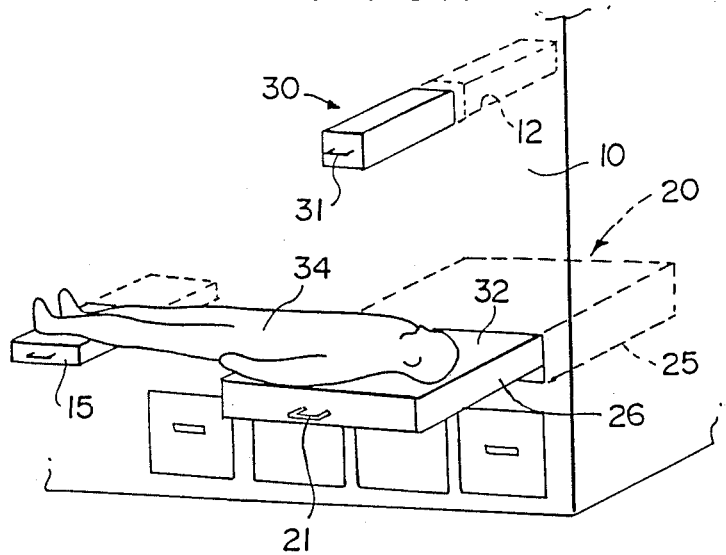
FIG. 1 is a general perspective view showing an embodiment of the radiation image recording and read-out apparatus in accordance with the present invention.

Referring to FIG. 1, an embodiment of the radiation image recording and read-out apparatus in accordance with the present invention comprises a main body 20 housed in a wall 10 of a medical examination room of a hospital or the like, and a radiation source housing section 30 adapted for housing in the wall 10. The main body 20 is constituted by a case 25 housing a light shielding cover 26 projectable out of the case 25. When the apparatus is not in use, the light shielding cover 26 is housed in the case 25, i.e. in the wall 10, and the radiation source housing section 30 is housed in a recess 12 in the wall 10. When the apparatus is to be used, the light shielding cover 26 and the radiation source housing section 30 are pulled out of the wall 10 by means of, for example, handles 21 and 31 respectively.

Figure 2:
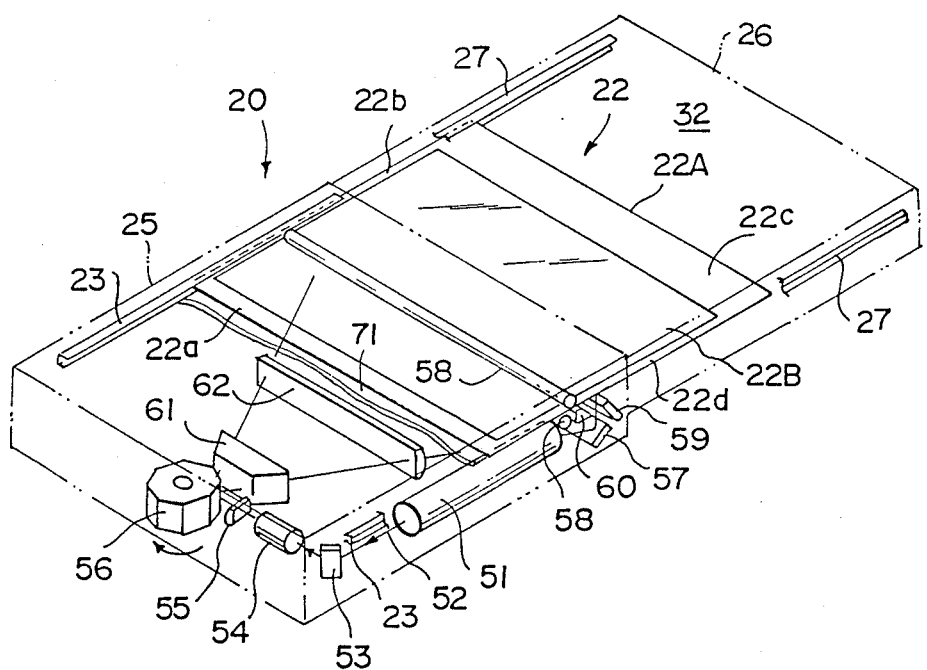
FIG. 2 is a perspective view showing the principal parts of the embodiment of FIG. 1, FIGS. 3 and 4 are sectional side views showing the conditions of the embodiment of FIG. 1 during image recording and image read-out.

FIG. 2 shows the configuration of the main body 20 in detail, and FIG. 3 is a sectional side view showing the configuration of the main body 20 and the radiation source housing section 30. A stimulable phosphor sheet 22 comprising a plate-like substrate 22A and a stimulable phosphor layer 22B overlaid on the substrate 22A is disposed inside of the case 25 of the main body 25. The substrate 22A of the stimulable phosphor sheet 22 is formed to be larger than the stimulable phosphor layer 22B, and the portions of the substrate 22A around the stimulable phosphor layer 22B constitute holding portions 22a, 22b, 22c and 22d. In this embodiment, the stimulable phosphor sheet 22 is positioned so that the stimulable phosphor layer 22B comes under the substrate 22A. The holding portions 22b and 22d are slideably supported on rails 23, 23, and the stimulable phosphor sheet 22 is thereby supported inside of the case 25. The length and width of the case 25 are adjusted to be slightly greater than those of the stimulable phosphor sheet 22.

As shown in FIG. 3, the case 25 is provided with an opening 25a at an end portion on the side of the wall 10, and the light shielding cover 26 housed in the case 25 is projectable out of the case 25 through the opening 25a. Though the light shielding cover 26 is manually projected out of the case 25 by means of the handle 21 in this embodiment, the light shielding cover 26 may also be moved by a drive device to project it out of the case 25. The light shielding cover 26 is provided with a sheet passage opening 26a at one end portion, i.e. at the end portion on the side supported by the case 25 when the light shielding cover 26 is projected out of the case 25. Therefore, the inside of the light shielding cover 26 is communicated with the inside of the case 25 via the sheet passage opening 26a. When the light shielding cover 26 is housed in the case 25, the stimulable phosphor sheet 22 is positioned inside of the light shielding cover 26.

The upper surface of the light shielding cover 26, i.e. the surface facing the stimulable phosphor sheet 22 from above when the stimulable phosphor sheet 22 is housed in the light shielding cover 26, constitutes an image recording table 32. The radiation source housing section 30 houses a radiation source 33 which may be an X-ray tube or the like and which faces the image recording table 32 as shown in FIG. 3 when the radiation source housing section 30 and the light shielding cover 26 are pulled out from the wall 10 in the course of using the apparatus. The case 25 and the portions of the light shielding cover 26 outside of the image recording table 32 are lined with a radiation absorbing material such as a lead plate so that no fogging is produced on the stimulable phosphor sheet 22 by environmental or other such radiations other than the radiation used for image recording.

When a radiation image of an object 34 should be recorded, the object 34 is made to lie, for example, on his back, on the image recording table 32 of the light shielding cover 26 projected out of the wall 10, and the stimulable phosphor sheet 22 is conveyed by drive rollers 58, 58 as described later up to the exposure position facing the image recording table 32 as shown in FIG. 3. The radiation source 33 is activated in this condition, and the stimulable phosphor sheet 22 is exposed to a radiation 35 passing through the object 34 to have a radiation image of the object 34 stored thereon, specifically on the stimulable phosphor layer 22B formed on the lower surface side of the stimulable phosphor sheet 22. The stimulable phosphor sheet 22 is supported inside of the light shielding cover 26 by rails 27, 27 which are approximately aligned with the rails 23, 23 of the case 25. Thus in this embodiment, an image recording section 40 is constituted by the image recording table 32 and the radiation source 33. Also, as shown in FIG. 1, the legs of the object 34 are supported by a supporting base 15 adapted to be housed in the wall 10.

An image read-out section 50 is provided at a lower section inside of the case 25. The image read-out section 50 is provided with a laser beam source 51, a mirror 53 for reflecting a laser beam 52 emitted as stimulating rays by the laser beam source 51, a beam expander 54 for adjusting the beam diameter of the laser beam 52 to a predetermined value, a cylindrical lens 55 for making the laser beam 52 impinge upon a mirror surface of a light deflector 56 described later so as to form a linear image normal to the rotation axis of the light deflector 56, and the light deflector 56 constituted by a multi-face rotating mirror or the like for reflecting and deflecting the laser beam 52. The image read-out section 50 is also provided with a long mirror 57 for reflecting the deflected laser beam 52 so that the laser beam 52 scans the stimulable phosphor sheet 22, specifically the stimulable phosphor layer 22B, in one direction, and drive rollers 58, 58 acting as a sub-scanning means constituted by a pair of nip rollers for grasping the stimulable phosphor sheet 22 and rotated at a predetermined speed. The image read-out section 50 also comprises a long photomultiplier 59 acting as a photoelectric read-out means and positioned so that the light receiving face extends along the scanning line (main scanning line) of the laser beam 52 on the stimulable phosphor sheet 22, and a long light guide reflection mirror 60 positioned along the long photomultiplier 59. Also, an $f\theta$ lens 61 and a cylindrical lens 62 are positioned between the light deflector 56 and the mirror 57, and the laser beam 52 is thereby made to converge to a predetermined beam diameter at every position on the stimulable phosphor sheet 22.

As shown in FIG. 4, after the radiation image of the object 34 is stored on the stimulable phosphor sheet 22 as mentioned above, the drive rollers 58, 58 are rotated and the stimulable phosphor sheet 22 is moved at a predetermined speed from the light shielding cover 26 to the case 25. When radiation image recording is conducted, the drive rollers 58, 58 grasp the holding portion 22a at one end of the stimulable phosphor sheet 22. Therefore, when the drive rollers 58, 58 are rotated after image recording is conducted, the stimulable phosphor sheet 22 can be immediately conveyed at mentioned above. Simultaneously with the conveyance of the stimulable phosphor sheet 22, the laser beam source 51 and the light deflector 56 are activated, and the laser beam 52 is made to scan on the sheet 22. As the stimulable phosphor sheet 22 is exposed to the laser beam 52, the exposed portion of the sheet 22 emits light 63 carrying the radiation image stored on the sheet 22. The emitted light 63 is efficiently detected by the long photomultiplier 59 directly or after being reflected by the light guide reflection mirror 60. The scanning of the laser beam 52 in the main scanning direction is conducted as described above, and at the same time the stimulable phosphor sheet 22 is moved in the sub-scanning direction as mentioned above. Accordingly, the emitted light 63, i.e. the radiation image, is two-dimensionally read out of the stimulable phosphor sheet 22. The read-out image signal generated by the long photomultiplier 59 is amplified, digitized and processed by a read-out circuit 64, and then sent to an image reproducing apparatus (not shown) wherein the image signal is used for reproducing a visible radiation image. The image reproducing apparatus may be a display means such as a cathode ray tube (CRT) or an apparatus for light beam scanning recording on a light-sensitive film, or may be replaced by an apparatus for storing the image signal on an image file such as an optical disk or a magnetic disk. Also, the image signal may be sent to a remote position, where there are personnel and instruments for medical examination, through radio communication and used for radiation image reproduction and diagnosis.

As shown in FIG. 4, when the stimulable phosphor sheet 22 is moved by the drive rollers 58, 58 in the subscanning direction, the sheet 22 passes through the sheet passage opening 26a and moves from the light shielding cover 26 to the case 25. The laser beam 52 scans the sheet 22 at the position near the opening 25a of the case 25. When image read-out is finished, the stimulable phosphor sheet 22 is positioned inside of the case 25. Therefore, it is not necessary to provide the case 25 with a special space for sub-scanning of the sheet 22, it only being necessary that the case 25 is of a size that is slightly larger than the sheet 22.

When image read-out is finished as mentioned above, the holding portion 22c of the stimulable phosphor sheet 22 is gripped between the drive rollers 58, 58 and the sheet 22 is supported by rails 23, 23. An erasing section 70 is provided under the stimulable phosphor sheet 22 in this condition. The erasing section 70 is constituted, by way of example, by a surface type erasing light source 71 which faces the sheet 22 from below. The erasing light source 71 is constituted by, for example, an LED panel or an EL (electroluminescence) plate, and mainly emits light having a wavelength within the stimulation wavelength range for the stimulable phosphor constituting the stimulable phosphor sheet 22. The erasing light source 71 is turned on when image read-out from the sheet 22 is finished. When the sheet 22, specifically the stimulable phosphor layer 22B, is exposed to the erasing light, radiation energy remaining on the sheet 22 after image read-out is released from the sheet 22.

In this manner, the stimulable phosphor sheet 22 on which the image (residual image) has been erased to such an extent that the sheet 22 may be reused for radiation image recording is housed in the case 25. Therefore, it becomes possible to repeat the aforesaid image recording and read-out using the sheet 22. As the erasing light source 71, besides the surface type light source such as the LED panel, it is also possible to use a tungsten-filament lamp, a halogen lamp, an infrared lamp, a xenon flash lamp, a fluorescent lamp or the like as disclosed, for example, in U.S. Pat. No. 4,400,619. In the case where such a lamp is used as the erasing light source 71, in order to expose the entire area of the stationary stimulable phosphor sheet 22 in the case 25, a plurality of the lamps may be arrayed side by side, or a rod-like light source may be positioned in the vicinity of the drive rollers 58, 58 therealong for emitting erasing light to the stimulable phosphor sheet 22 conveyed from the case 25 to the light shielding cover 26 before the next radiation image recording is conducted. In the case where residual image erasing is conducted during conveyance of the sheet 22, the substrate 22A of the sheet 22 may be formed of a transparent member, and erasing light may be emitted to the stimulable phosphor layer 22B via the substrate 22A from above the sheet 22.

As shown in FIG. 5 showing another embodiment of the radiation image recording and read-out apparatus in accordance with the present invention, when the substrate 22A is formed of a transparent member, the surface type erasing light source 71 ma be disposed on the side opposite to the image read-out section 50 with the sheet 22 intervening therebetween. In FIG. 5, similar elements are numbered with the same reference numerals with respect to FIGS. 1 to 4 (this also applies to the other drawings).

Figure 6:
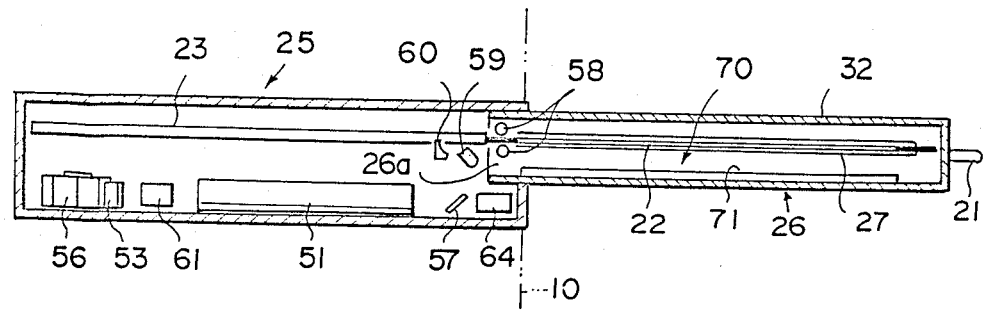

As shown in FIG. 6 showing a further embodiment of the radiation image recording and read-out apparatus in accordance with the present invention, the erasing light source 71 may be positioned inside of the light shielding cover 26.

For example, in the case where the stimulable phosphor sheet 22 has been maintained for long time in the case 25 without being used for image recording after image (residual image) erasing is conducted on the sheet 22 at the erasing section 70, energy of radiations emitted by radioactive isotopes such as 226Ra, which are contained in a trace amount in the stimulable phosphor, or energy of environmental radiations may be stored on the sheet 22 and cause noise in a radiation image recorded next on the sheet 22. However, energy of such radiations is also released (secondary erasing) by exposing the sheet 22 to the erasing light emitted by the erasing light source 71 immediately before the image recording. Also in the case where the surface type light source is used as the erasing light source 71, instead of conducting image (residual image) erasing immediately when the stimulable phosphor sheet 22 is returned into the case 25 after the image read-out is finished, the erasing may be carried out just prior to the next radiation image recording. In this case, it is possible to conduct the residual image erasing and the secondary erasing by a single erasing step. Also, in this case, since radiation energy of the residual image component remaining on the stimulable phosphor sheet 22 is naturally released and decays to some extent, it becomes possible to decrease the erasing light amount for the residual image erasing.

Figure 7:
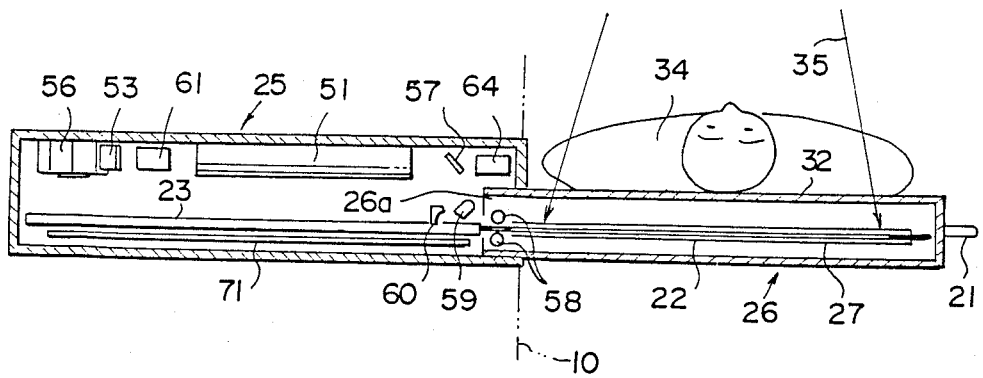

In the aforesaid embodiments, image read-out is conducted o the side opposite to the radiation exposure side of the stimulable phosphor sheet 22. However, as shown in FIG. 7, the laser beam 52 may be emitted from the radiation exposure side of the sheet 22, and the sheet 22 may be positioned so that the stimulable phosphor layer faces the radiation exposure side, thereby conducting the image read-out from the same side as the radiation exposure side. Also, the stimulable phosphor sheet 22 may be quickly returned into the case 25 after the image recording, and may then be conveyed from the case 25 to the light shielding cover 26, and the image read-out may be conducted during said conveyance. In this case, since the stimulable phosphor sheet 22 before the image read-out is quickly retracted from the position facing the image recording table 32, it is possible to prevent fogging of the sheet 22 caused by environmental radiations or the like.

On the other hand, in order to eliminate various influences caused by variations in radiographic exposure conditions and/or to obtain a radiation image having a high image quality or a high diagnostic efficiency and accuracy, it is necessary to investigate such image input conditions of the radiation image stored on the stimulable phosphor sheet 22 as, for example, the level of radiation dose used for image recording, or the image input pattern which is determined by the portion of the object 34 (e.g. the chest or the abdomen of the human body) or the image recording method used, such as plain image recording or contrasted image recording, before reproducing the radiation image as a visible image, and then to adjust the read-out conditions such as the read-out gain and scale factor and/or the image processing conditions in the read-out circuit 64 based on the detected image input conditions or the image input pattern. The image input conditions and the image input pattern will hereinafter be generically referred to as the image input information. Investigation of the image input information may be conducted prior to the visible image reproduction by use of the method as disclosed in Japanese Unexamined Patent Publication No. 58(1983)-67240. In the disclosed method, read-out operation for detecting the image input information of the radiation image stored on the stimulable phosphor sheet 22 (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out conditions such as the read-out gain and the scale factor are adjusted to appropriate values, and/or an appropriate image processing is conducted, on the basis of the image input information obtained by the preliminary read-out. Also in the aforesaid embodiments, it is possible to easily conduct the preliminary read-out and the final read-out. Specifically, the preliminary read-out is first conducted while the stimulable phosphor sheet 22 is conveyed from the light shielding cover 26 to the case 25, the sheet 22 is then returned into the light shielding cover 26 (at this time, the erasing light source 71 is not turned on), and thereafter the final read-out is conducted while the sheet 22 is conveyed from the light shielding cover 26 to the case 25. Instead of returning the stimulable phosphor sheet 22 to the light shielding cover 26, the sheet 22 may also be conveyed from the case 25 to the light shielding cover 26 after the preliminary read-out is finished, and the final read-out may be conducted during said conveyance.

Figure 8:
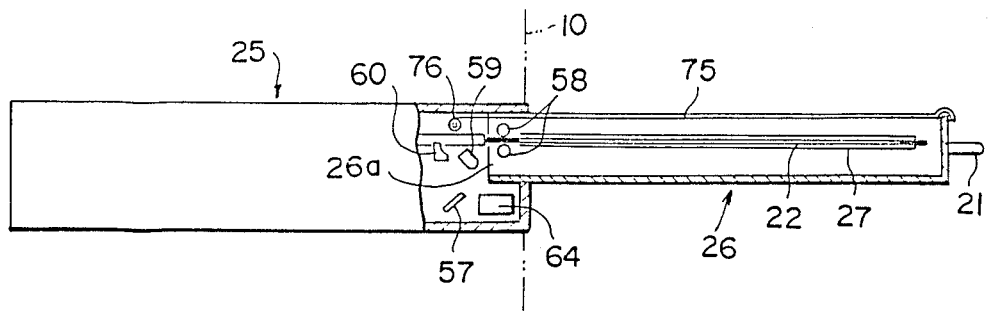
Figure 9:
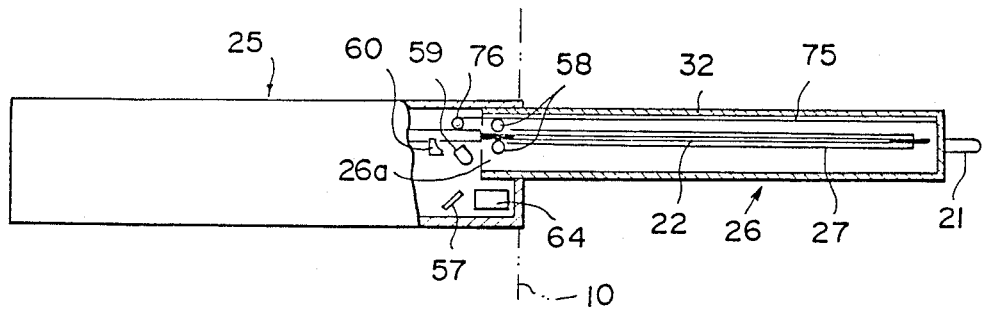
Figure 10:
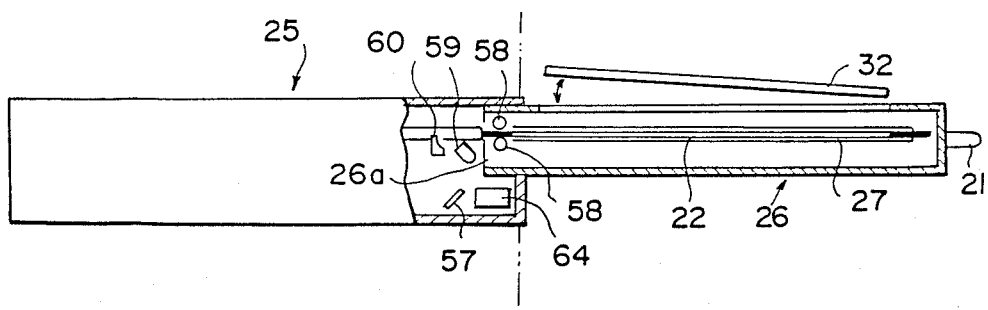

Though the erasing light source 71 is positioned inside of the case 25 or the light shielding cover 26 in the aforesaid embodiments, it is also possible to utilize indoor illumination light as the erasing light. FIGS. 8, 9 and 10 show such embodiments.

In FIG. 8, the upper side of the light shielding cover 26 is opened, and a light shielding screen 75 is positioned at the opened side. The light shielding screen 75 is wound up by a wind-up device 76 inside of the case 25 prior to the radiation image recording to lay the stimulable phosphor sheet 22 bare inside of the light shielding cover 26. The bared sheet 22 is subjected to the residual image erasing and/or the secondary erasing by the indoor illumination light. After the erasing is conducted, the light shielding screen 75 is moved to close the upper side of the light shielding cover 26 so that the sheet 22 is not exposed to ambient light.

In another embodiment shown in FIG. 9, the upper surface of the light shielding cover 26, i.e. the image recording table 32, is formed of a transparent member, and the light shielding screen 75 is positioned between the image recording table 32 and the stimulable phosphor sheet 22. The light shielding screen 75 is wound up and delivered by the wind-up device 76. In this embodiment, it is possible to place an object on the image recording table 32 unlike the embodiment of FIG. 8.

In a further embodiment shown in FIG. 10, the upper surface of the image recording table 32 acting as the image recording table 32 is mounted removably. In this embodiment, the stimulable phosphor sheet 22 in the light shielding cover 26 is bared by removing the image recording table 32. The bared sheet 22 may then be subjected to the residual image erasing and/or the secondary erasing by the indoor illumination light. In the case where the indoor illumination light is utilized as the erasing light, though it is possible to effect the erasing with just the indoor light, a long time will be taken for the erasing. Therefore, a small-scale erasing light source should preferably be provided in the apparatus, and the erasing should be conducted with the light emitted by the erasing light source and the indoor light for shortening the erasing time.

The long photomultiplier 59 is described in detail, for example, in Japanese Patent Application No. 60(1985)–156255, and will now be briefly described with reference to FIGS. 17A, 17B and 18. The long photomultiplier 59 shown in FIGS. 17A and 17B has a electrode configuration that is generally called a box type. The photomultiplier 59 comprises a vacuum body 151 fabricated of glass or the like, a photocathode (photoelectric face) 153 positioned to face the long light receiving face 152 for emitting photoelectrons in the vacuum body 151, and a multiplying section 167 positioned under the photocathode 153 in the vacuum body 151 and including a plurality (13 pieces in this example) of electrodes (dynodes) 154 through 166 having a quarter cylinder shape and exhibiting the secondary electron emission effect. A shield electrode 168 is positioned to face the lowermost dynode 166 of the multiplying section 167, and an anode 169 for collecting the electron streams multiplied by the multiplying section 167 and generating a signal positioned inside of the shield electrode 168. These electrodes are respectively connected electrically in a one-to-one relation with terminals 172, 172, ... of a terminal group 170 positioned on the side opposite to the light receiving face 152. The dynodes 154 through 166 and the shield electrode 168 are secured inside of the body 151 by supporting members 71, 71, 71 fabricated of an insulating material.

FIG. 18 shows an electrical circuit 180 for operating the photomultiplier 59 and obtaining a photoelectric output. In FIG. 18, similar elements are numbered with the same reference numerals with respect to FIG. 17A. A high negative voltage is applied to the photocathode 153 via a high negative voltage applying terminal 181. The high negative voltage applied to the high negative voltage applying terminal 181 is divided by a bleeder resistance group 182 into voltages which are applied respectively to the dynodes 154 through 166. The shield electrode 168 is grounded, and the anode 169 is grounded via a resistor 183 and is connected with one of the terminals of an amplifier 184. The other terminal of the amplifier 184 is grounded. The photoelectrically converted image information is obtained as an electric signal from an output terminal 185 of the amplifier 184. As the long photomultiplier 59, it is also possible to use a photomultiplier having an electrode configuration generally called a venetian blind type as described, for example, in Japanese patent application No. 60(1985)-156255.

The photoelectric read-out means used in the present invention is not limited to the long photomultiplier 59, and it is also possible to a photoelectric read-out means comprising a photodetector having a comparatively small light receiving face, and a light guide member optically coupled with the photodetector as disclosed, for example, in Japanese Unexamined Patent Publication No. 59(1984)–192240. However, the long photomultiplier 59 is advantageous since it solves the problems of increased apparatus size when the large light guide member is used, the decrease in light detection efficiency due to leakage of the light emitted by the stimulable phosphor sheet from the light guide member, and the increased cost of the apparatus because of the fabrication of the light guide member in a complicated shape. Also, when the long photomultiplier 59 is used, it is possible to improve the light guide efficiency by combining the long photomultiplier 59 with the light guide reflection mirror 60, or by combining it with an integrating cylinder as proposed in Japanese patent application No. 60(1985)–156257, or by combining an integrating cylinder with a reflection optical element as proposed in Japanese Patent Application No. 60(1985)-156258.

Figure 11:
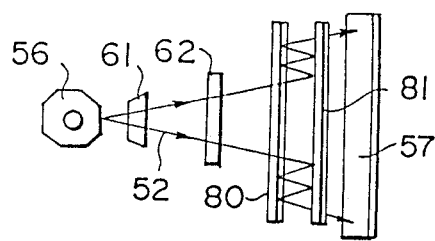
FIGS. 11 and 12 are a plan view and a side view showing an example of the stimulating ray reflection optical system used in the radiation image recording and read-out apparatus of the present invention.
Figure 12:
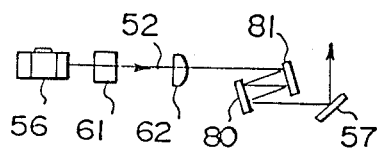
Figure 13:
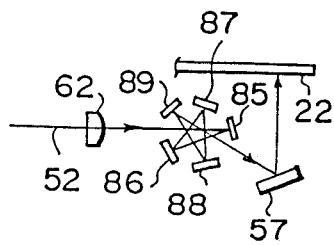
FIG. 13 is a side view showing another example of the stimulating ray reflection optical system used in the radiation image recording and read-out apparatus of the present invention.

With the aforesaid embodiments, since the stimulable phosphor sheet 22 is conveyed between the case 25 and the light shielding cover 26 in the course of the image read-out, the case 25 may be made small to a size (length and width) slightly larger than the stimulable phosphor sheet 22. However, when the case 25 is made small, the optical path of the laser beam 52 deflected in the case 25 may not be adjusted to be substantially long. In such a case, as shown in FIGS. 11 and 12, a pair of mirrors 80 and 81 may be positioned between the cylindrical lens 62 and the mirror 57 so that the laser beam 52 is repeatedly reflected between the mirrors 80 and 81 and the optical path is adjusted to be substantially long. Also, as shown in FIG. 13, a plurality of mirrors 85, 86, 87, 88 and 89 may be disposed to make the optical path long.

Figure 15:
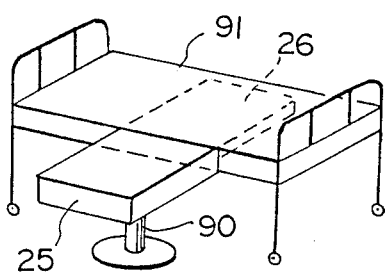
FIGS. 14, 15 and 16 are perspective views showing further embodiments of the radiation image recording and read-out apparatus in accordance with the present invention.
Figure 16:
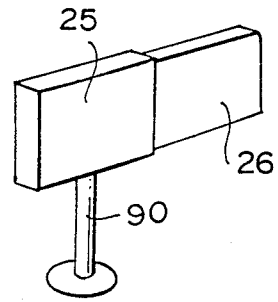
Figure 14:
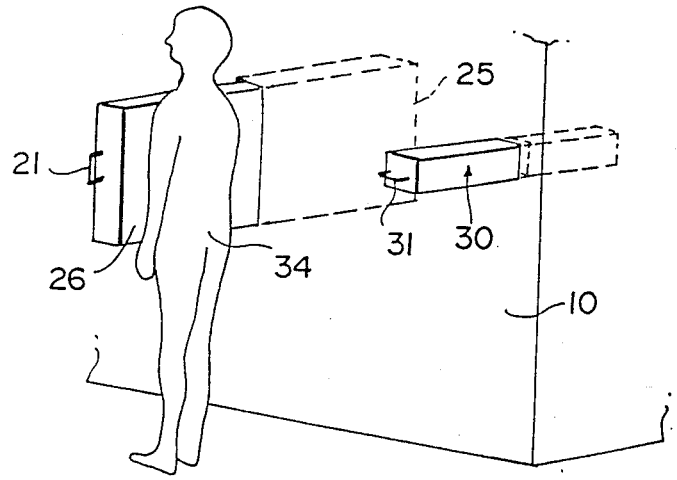

Also, as shown in FIG. 14, the radiation image recording and read-out apparatus of the present invention may be fabricated so that the radiation source housing section 30 and the main body 20 are positioned in a horizontally spaced relation to each other and the image recording is conducted with the object 34 in a standing position. Or, as shown in FIG. 15, the case 25 may be supported horizontally by a stand 90, the light shielding cover 26 projected out of the case 25 may be positioned under a bed 91, and the image recording may be conducted with the object lying on the bed 91. Alternatively, as shown in FIG. 16, the case 25 may be supported vertically by the stand 90, and the image recording may be conducted with the object in a standing position.

Figure 19:
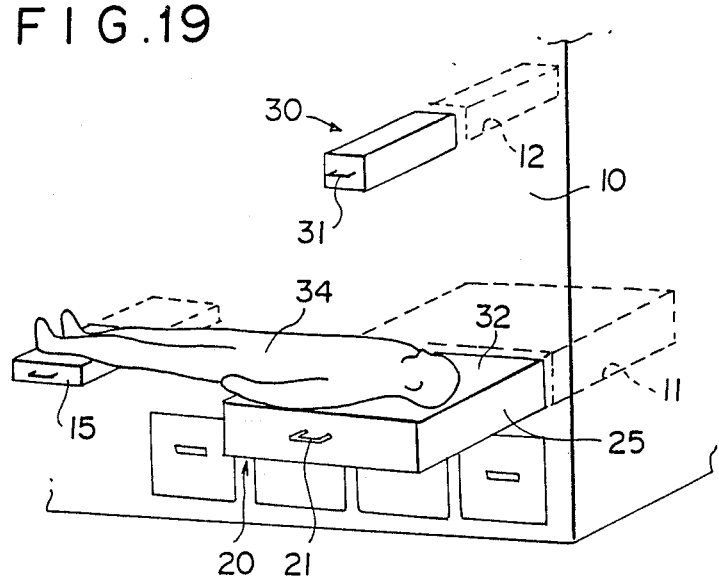
FIG. 19 is a general perspective view showing another embodiment of the radiation image recording and readout apparatus in accordance with the present invention.

FIG. 19 shows another embodiment of the radiation image recording and read-out apparatus in accordance with the present invention. In FIG. 19 and subsequent drawings, similar elements are numbered with the same reference numerals with respect to FIGS. 1 to 14. The embodiment of FIG. 19 comprises the main body 20 adapted to be housed in the wall 10, and the radiation source housing section 30. When the apparatus is not in use, the main body 20 and the radiation source housing section 30 are housed in the recesses 11 and 12 in the wall 10.

Figure 20:
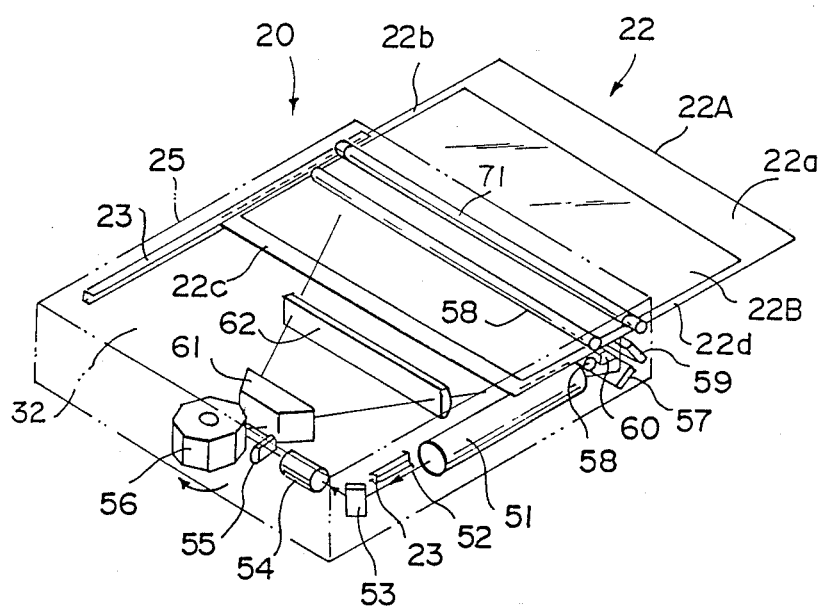
FIG. 20 is a perspective view showing the principal parts of the embodiment of FIG. 19, FIGS. 21 and 22 are sectional side views showing the conditions of the embodiment of FIG. 19 during image recording and image read-out.
Figure 21:
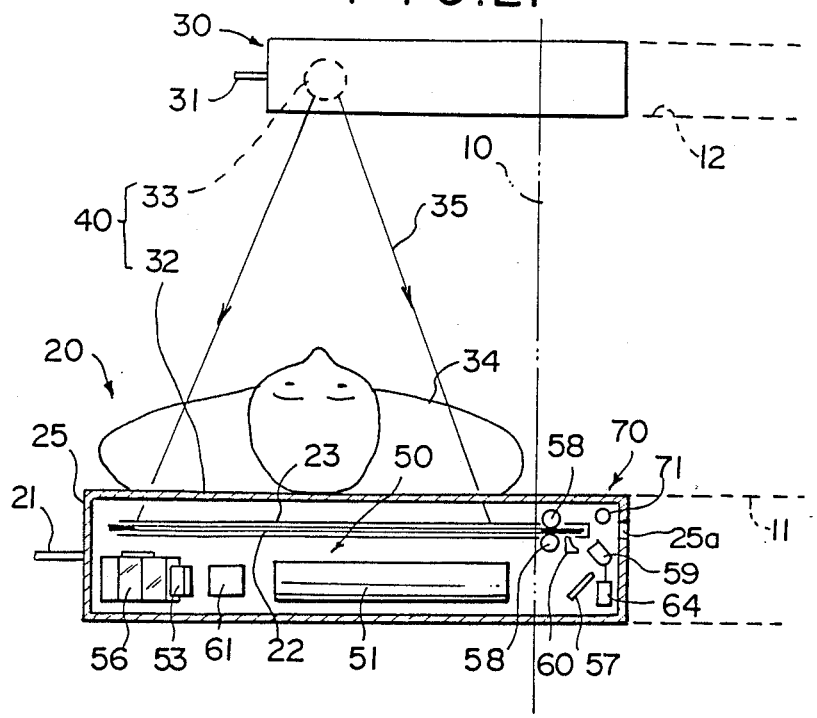

As shown in FIG. 20, the stimulable phosphor sheet 22 comprising a transparent substrate 22A and a stimulable phosphor layer 22B overlaid on the substrate 22A is positioned in the case 25 of the main body 20. The upper surface of the case 25, i.e. the surface facing the sheet 22 from above when the sheet 22 is housed in the case 25, constitutes the image recording table 32. As shown in FIG. 21, when the apparatus is in the state in which it is used, i.e. when the radiation source housing section 30 and the main body 20 are pulled out of the wall 10, the radiation source 33 faces the image recording table 32. The end portion of the case 25 on the side of the recess 11 is provided with an elongated opening 25a which faces the end face of the sheet 22.

Figure 22:
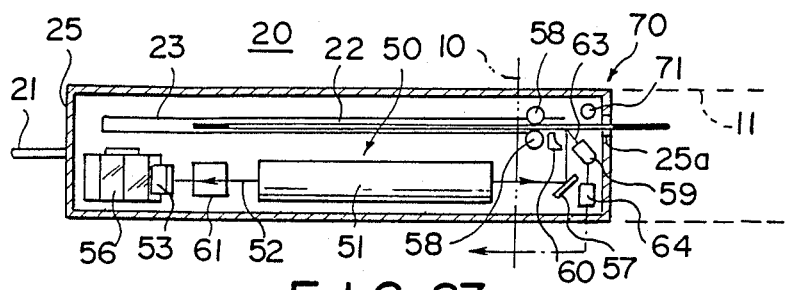

As shown in FIG. 22, after a radiation image of the object 34 is stored on the stimulable phosphor sheet 22, the drive rollers 58, 58 are rotated to move the sheet 22 at a predetermined speed towards the opening 25a. When radiation image recording is conducted, the drive rollers 58, 58 grip the holding portion 22a at one end of the sheet 22. Therefore, when the drive rollers 58, 58 are rotated after the image recording, the sheet 22 is immediately conveyed as mentioned above. When the sheet 22 carrying the radiation image stored thereon is thus moved by the drive rollers 58, 58 in the sub-scanning direction, the sheet 22 passes through the opening 25a and is projected out of the case 25. Since the laser beam 52 scans the sheet 22 in the vicinity of the opening 25a, almost the whole of the sheet 22 is projected out of the case 25 when the image read-out is finished. Therefore, the case 25 need not be provided with a special space for the sub-scanning of the sheet 22, and may be formed to a size slightly larger than the sheet 22.

Figure 23:
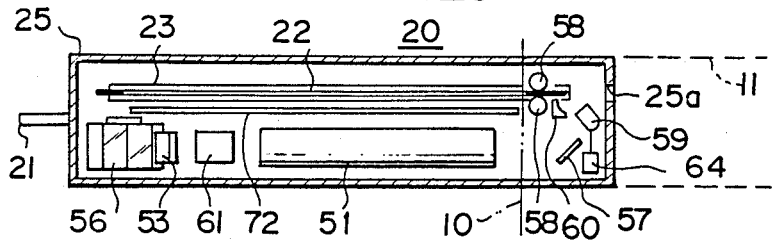
FIG. 23 is a sectional side view showing a further embodiment of the radiation image recording and read-out apparatus in accordance with the present invention.

When the image read-out is finished as mentioned above, the stimulable phosphor sheet 22 is gripped at the holding portion 22c between the drive rollers 58, 58. In this condition, the drive rollers 58, 58 are rotated reversely to the rotating direction at the time of the image read-out, and the sheet 22 is returned to the exposure position inside of the case 25, i.e. to the position facing the image recording table 32. In the course of returning, the sheet 22 passes under the erasing section 70 provided inside of the case 25 in the vicinity of the opening 25a, and is subjected to image (residual image) erasing. By way of example, the erasing section 70 is constituted by an erasing light source 71 positioned above the sheet 22. The erasing light source 71 is constituted by a fluorescent lamp or the like, and is turned on when the sheet 22 is returned to the exposure position. Thus the stimulable phosphor layer 22B is exposed via the transparent substrate 22A to the erasing light. As shown in FIG. 23, the erasing section 70 may be constituted by a surface type erasing light source 72 such as an EL (electroluminescence) plate positioned under the sheet 22 at the exposure position to face the stimulable phosphor layer 22B. In this case, the substrate 22A need not necessarily be formed of a transparent member. With the configuration of FIG. 23, it is possible to conduct the secondary erasing easily by utilizing the surface type erasing light source 72. Also, the image (residual image) erasing may be conducted not immediately when the sheet 22 is returned into the case 25 after the image read-out, but may be carried out just prior to the next radiation image recording, thereby to perform the residual image recording and the secondary erasing by a single erasing step.

For example, In FIG. 21, the stimulable phosphor sheet 22 may be positioned with the stimulable phosphor layer, facing up, and the laser beam 52 may be emitted from above the sheet 22, thereby to conduct the image read-out from the same side as the exposure to the radiation. However, the image read-out should preferably be conducted as shown in FIG. 22 since the components of the image read-out section can be disposed on the side opposite to the exposure side and the apparatus can be made small.

In the case where the apparatus is constituted like the embodiment of FIG. 19 so that the stimulable phosphor sheet 22 is projected out of the case 25 into the recess 11 in the wall 10 during the image read-out, it is possible to conduct the preliminary read-out and the final read-out easily. Specifically, when the inside of the recess 11 is completely shielded from external light, the preliminary readout may be conducted by projecting the sheet 22 into the recess 11, and the sheet 22 may then be returned into the case 25 (at this time, the erasing light source 71 or 72 is not turned on). Thereafter, the final read-out may be conducted by projecting the sheet 22 out of the case 25 into the recess 11.

Figure 24:
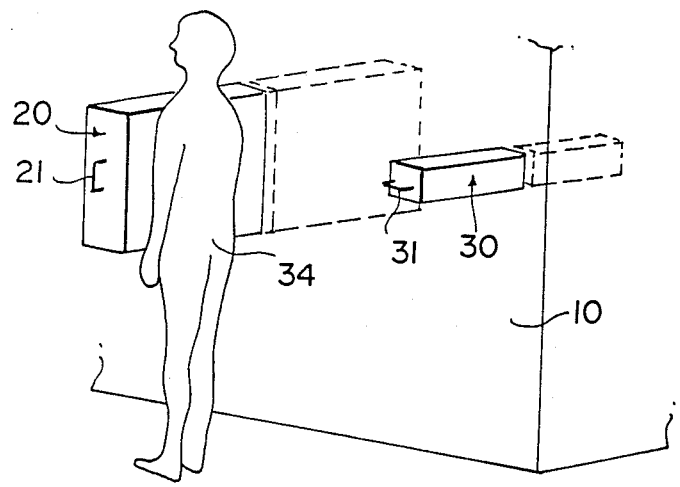
FIGS. 24, 25, 26 and 27 are perspective views showing still further embodiments of the radiation image recording and read-out apparatus in accordance with the present invention.
Figure 25:
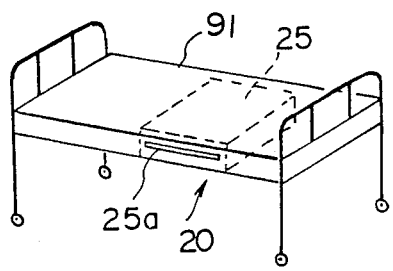
Figure 26:
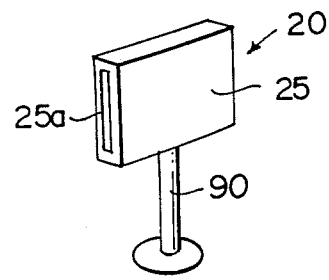
Figure 27:
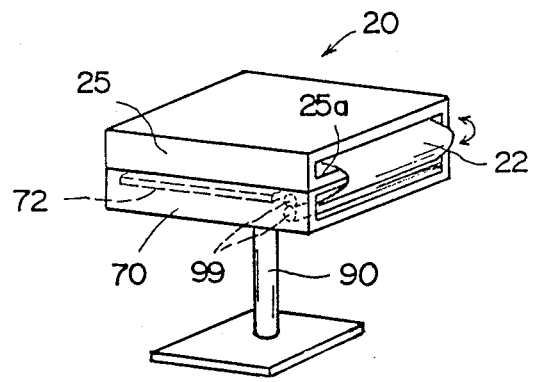

The embodiment of FIG. 19 may be modified as shown in FIG. 24. Alternatively, as shown in FIG. 25, the main body 20 may be incorporated in the bed 91. Or, as shown in FIG. 26, the main body 20 may be supported on the stand 90 so that the stimulable phosphor sheet 22 projecting out of the case 25 during the image read-out is visible from the exterior. Also, in the case where the main body 20 is housed in the wall 10, the opening 25a and the laser beam scanning section in the case 25 may be positioned on the front side of the main body 20, i.e. on the left side in FIG. 21, so that the sheet 22 projecting out of the case 25 during the image read-out is visible from the exterior. In this case, it is necessary to provide the opening 25a with a light shielding means so that no external light enters the case 25 during the image recording and the image read-out during which the sheet 22 is projected out of the case 25. It is also possible to omit the erasing light source 71 or 72, and to utilize indoor illumination light as the erasing light. Also, as shown in FIG. 27, the erasing section 70 may be positioned outside of the case 25. In this case, the sheet 22 projected out of the case 25 may be manually guided to the erasing section 70, and the erased sheet 22 ejected by rollers 99, 99 out of the erasing section 70 may be manually guided and returned to the case 25.

Figure 28:
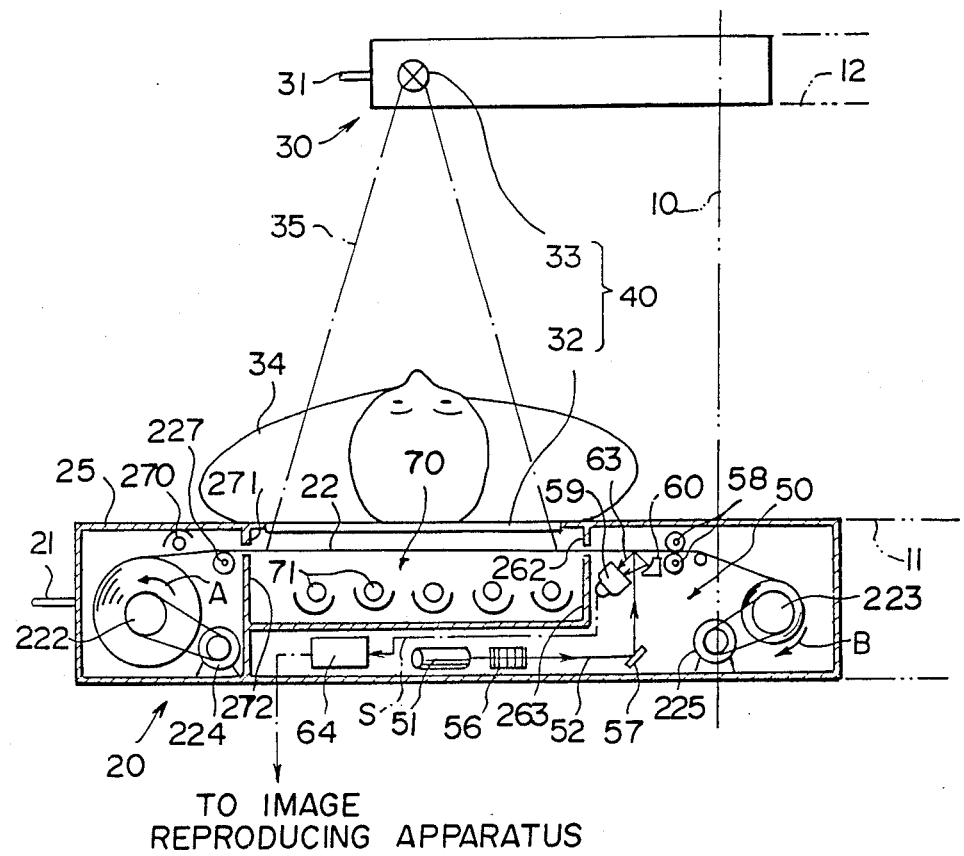
FIG. 28 is a sectional side view showing a further embodiment of the radiation image recording and read-out apparatus in accordance with the present invention.
Figure 29:
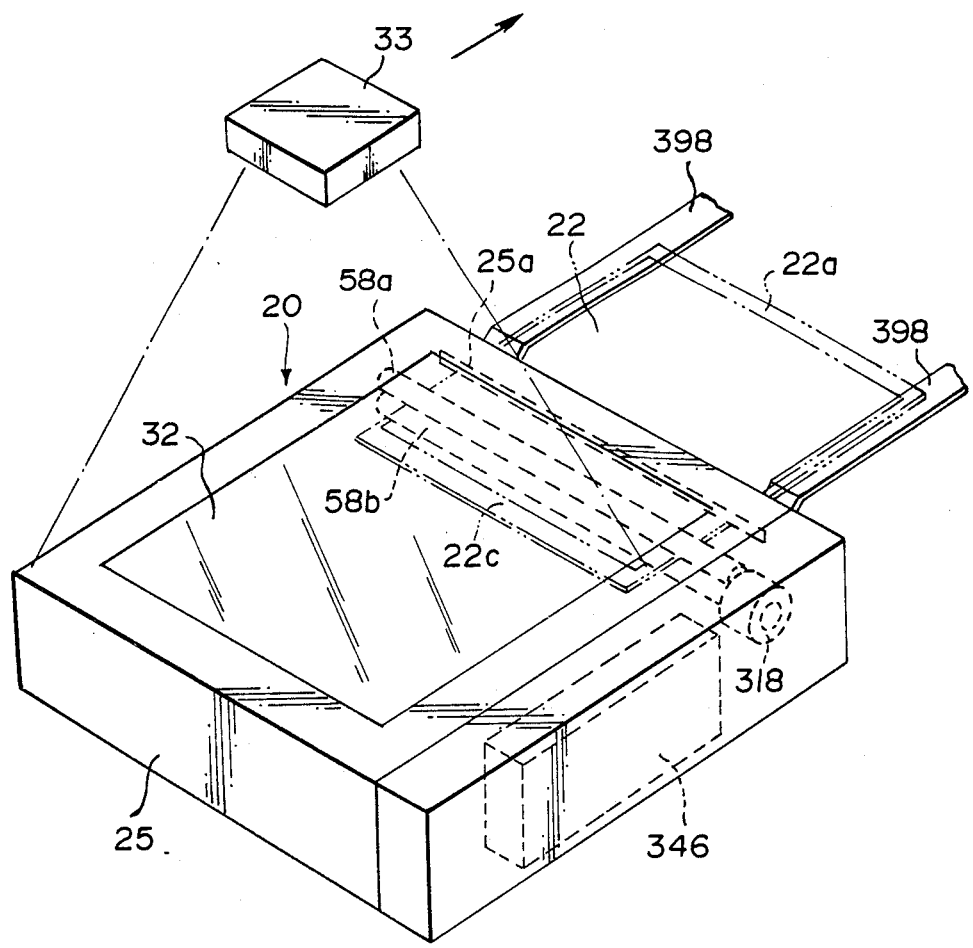
FIG. 29 is a perspective view showing a still further embodiment of the radiation image recording and read-out apparatus in accordance with the present invention.

FIG. 28 shows a further embodiment of the radiation image recording and read-out apparatus in accordance with the present invention, which has the general appearance as shown in FIG. 19. In this embodiment, a first wind-up shaft 222 and a second wind-up shaft 223 are in spaced and parallel relation to each other inside of the case 25 of the main body 20. The first wind-up shaft 222 and the second wind-up shaft 223 are rotated in the directions as indicated by the arrows A and B by motors 224 and 225, respectively, as the sheet feed means. One end of the stimulable phosphor sheet 22 is wound around the first wind-up shaft 222. The stimulable phosphor sheet 22 is formed in a long strip-like shape by using a flexible substrate. The other end of the stimulable phosphor sheet 22 is supported by the second windup shaft 223 and wound up therearound. Also, the sheet 22 is arranged between a roller 227 and drive rollers 58, 58 disposed between the first wind-up shaft 222 and the second wind-up shaft 223. The sheet 22 is positioned so that the flexible substrate permeable to the radiation faces up and the stimulable phosphor overlaid on the substrate faces down.

The image recording table 32 is positioned to face the stimulable phosphor sheet 22 arranged between the roller 227 and the drive rollers 58, 58, and the image read-out section 50 is positioned under the sheet 22 in the vicinity of the second wind-up shaft 223. After a radiation image of the object 34 is stored on the sheet 22, the drive rollers 58, 58 are rotated to convey the sheet 22 at a predetermined speed rightwardly in FIG. 28. At this time, the second wind-up shaft 223 is rotated to wind up the sheet 22 therearound. An appropriate load is given to the first wind-up shaft 222 by a known means to maintain the sheet 22 constantly in a tensioned condition. As the sheet 22 is thus conveyed, the laser beam source 51 and the light deflector 56 are activated to scan the sheet 22 with the laser beam 52.

The portion of the stimulable phosphor sheet 22 for which the image read-out is finished is wound up around the second wind-up shaft 223. Also, a different portion of the sheet 22 is fed from the first wind-up shaft 222 to the position between the roller 227 and the drive rollers 58, 58, and it becomes possible to record a radiation image on said portion of the sheet 22. When radiation image recording is thus conducted over approximately the entire length of the sheet 22 and the sheet 22 wound around the first wind-up shaft 222 has been fed to the second wind-up shaft 223, the motor 224 is operated to rotate the first wind-up shaft 222 in the direction as indicated by the arrow A and return the sheet 22, on which the image read-out is finished and which has been wound around the second wind-up shaft 223, from the second wind-up shaft 223 to the first wind-up shaft 222. At this time, the sheet 22 passes through the erasing section 70 positioned between the roller 227 and the drive rollers 58, 58, and is subjected to image (residual image) erasing. By way of example, the erasing section 70 comprises a plurality of the erasing light sources 71, 71, . . . positioned under the sheet 22 and turned on when the sheet 22 is being returned towards the first wind-up shaft 222. Since the erased sheet 22 is thus stored around the first wind-up shaft 222, it is possible to repeat the image recording and read-out using the sheet 22.

In the embodiment of FIG. 28, a secondary erasing light source 270 is positioned between the first wind-up shaft 222 and the image recording section 40. The secondary erasing light source 270 comprises a secondary erasing light source similar to those of the erasing section 70, and is turned on when the stimulable phosphor sheet 22 is delivered from the first wind-up shaft 222 for image recording. The secondary erasing light emitted by the secondary erasing light source is intercepted by light shielding plates 271 and 272 so that the sheet 22 prior to the image read-out is not exposed thereto.

The embodiment of FIG. 28 may also be used for repeating image recording prior to the image read-out at the image read-out section 50. In this case, the portions of the stimulable phosphor sheet 22 on which image recording has been conducted are wound up around the second wind-up shaft 223 without conducting the image read-out. After the image recording is thus finished, the sheet 22 is returned from the second wind-up shaft 223 to the first wind-up shaft 222, and the image read-out is conducted at the image read-out section 50 during said returning of the sheet 22. In this case, the erasing light emitted by the erasing light sources 71, 71, . . . is intercepted by light shielding plates 262 and 263 so that the sheet 22 prior to the image read-out is not exposed thereto. When the image read-out is to be conducted after repeating the image recording, the image read-out may be carried out after the main body 20 and the radiation source housing section 30 are housed in the wall 10.

In the case where the preliminary read-out and the final read-out are conducted in the embodiment of FIG. 28, the preliminary read-out may be carried out when the sheet 22 is being moved to the second wind-up shaft 223, and then the final read-out may be performed by moving the sheet 22 from the second wind-up shaft 223 to the first wind-up shaft 222.

Though the image read-out section and the erasing section 70 are positioned under the sheet 22 in FIG. 28, the sheet 22 may also be positioned with the stimulable phosphor layer facing up, and the image read-out section 50 and the erasing section 70 may be disposed above the sheet 22. However, the image read-out section 50 and the erasing section 70 should preferably be disposed as shown in FIG. 28 for efficiently utilizing the space between the first wind-up shaft 222 and the second wind-up shaft 223 and making the apparatus small. For example, in the case where the erasing section 70 is formed to be smaller, the erasing section 70 may be disposed between the image read-out section 50 and the second wind-up shaft 223, and the sheet 22 conveyed towards the second wind-up shaft 223 may be subjected to the image erasing immediately after the image read-out.

The embodiment of FIG. 28 may be modified as shown in FIG. 24. It is also possible to house the first wind-up shaft 222, the second wind-up shaft 223 and the stimulable phosphor sheet 22 in a unit which is removably mounted on the main body 20 and to exchange the unit for changing the sheet 22 when a sheet 22 of different type (sensitivity or the like) is to be used.

Figure 30:
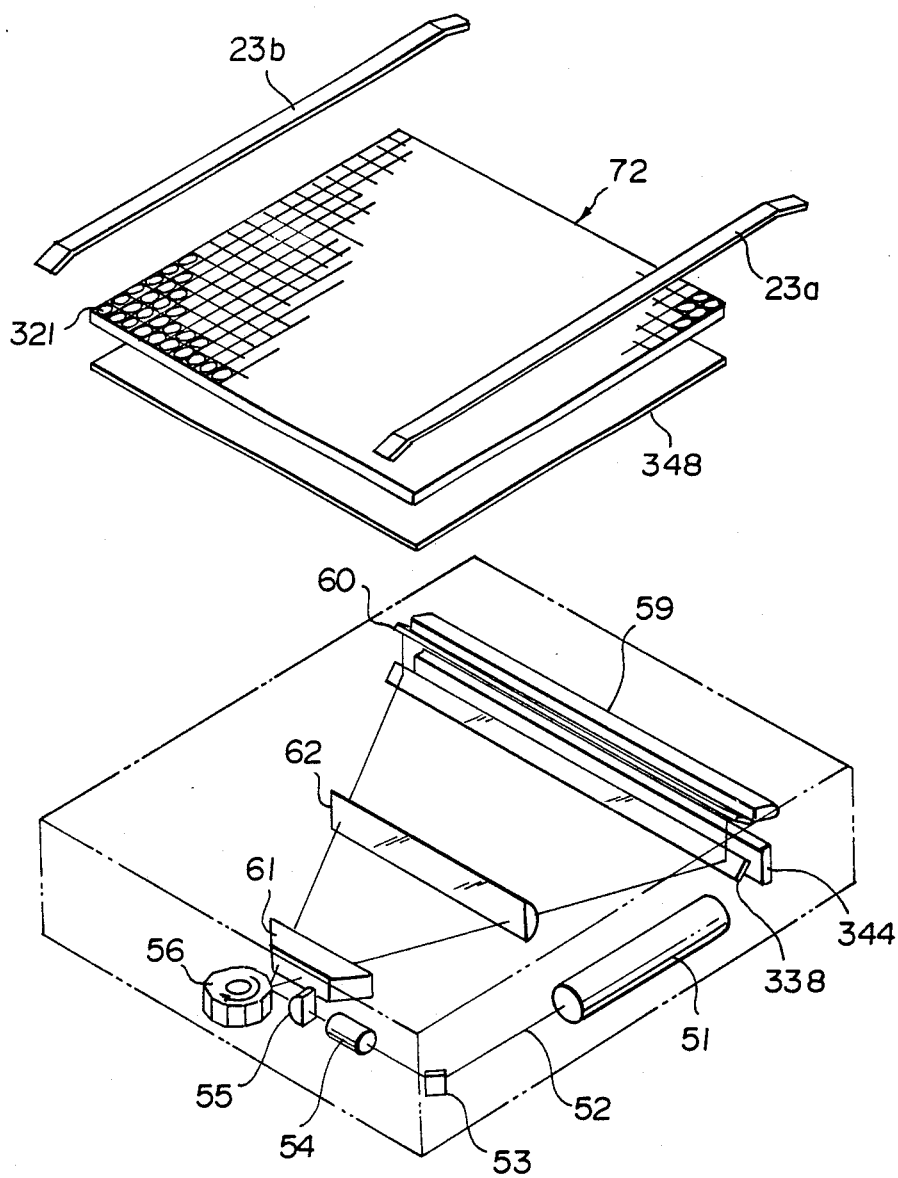
FIG. 30 is an exploded perspective view showing the embodiment of FIG. 29.
Figure 31:
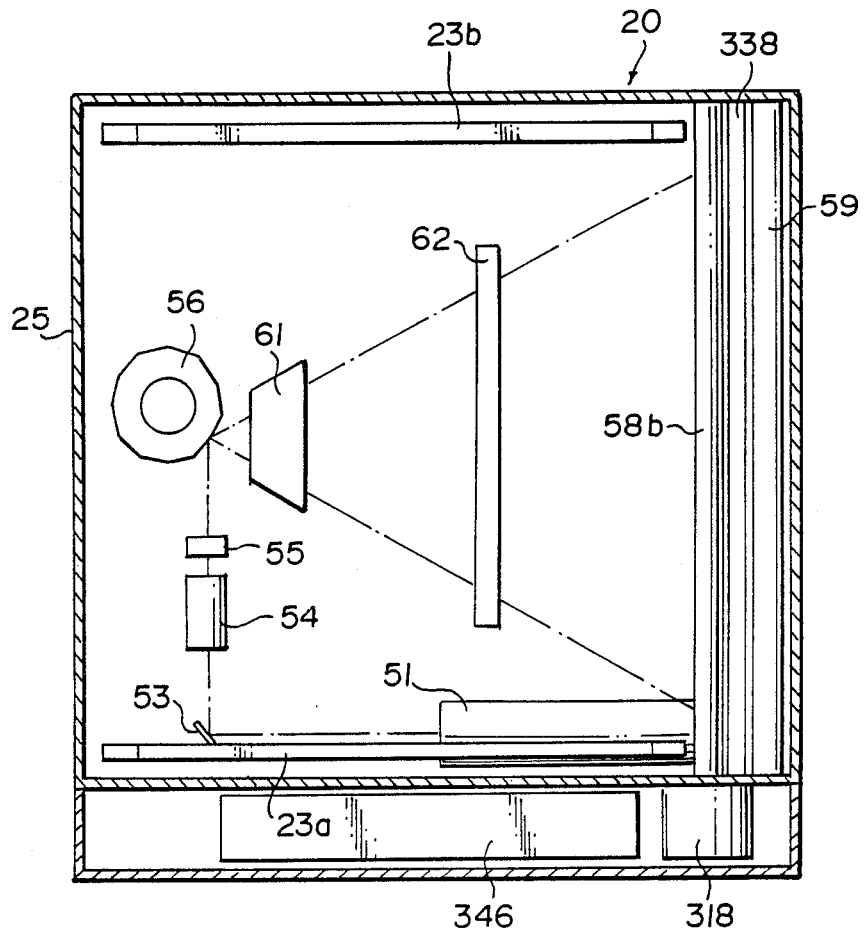
FIG. 31 is a transverse sectional view showing the embodiment of FIG. 29.

FIGS. 29 through 32 show a still further embodiment of the radiation image recording and read-out apparatus in accordance with the present invention. In this embodiment, a pair of nip rollers 58a and 58b for sheet conveyance are positioned one above the other to face the opening 25a in the case 25. The nip roller 58b is coupled with a drive shaft of a motor 318. Also, guide members 23a and 23b as shown in FIG. 30 having lengths approximately equal to the length of the stimulable phosphor sheet 22 are positioned at the same height as the upper end of the nip roller 58b rotated by the motor 318. As shown in FIG. 30, the erasing light source 72 comprising a plurality of light emitting diodes (LED) 321, 321, . . . arrayed closely are positioned under the space between the guide members 23a and 23b. The light emission area of the erasing light source 72 is substantially equal to or larger than the image recording region of the sheet 22.

A semi-transparent mirror 338 is positioned on the optical axis of the cylindrical lens 62 at an angle of 45° with respect to the horizontal under the opening 25a so that the semi-transparent mirror 338 partially reflects the laser beam 52 and partially transmits it to a grid 344. The photomultiplier 59 having a length approximately equal to the length of the opening 25a is positioned above the semitransparent mirror 338. A reflector 60 constituted by a reflection mirror is disposed in the vicinity of the photomultiplier 59 for guiding the light emitted by the stimulable phosphor sheet 22 to the photomultiplier 59. The grid 344 receives the laser beam 52 passing through the semitransparent mirror 338 and, for example, generates a rotation control signal for the light deflector 56 or the like as a synchronizing signal.

On the other hand, an electric source 346 may be positioned outside of the case 25, and a printed circuit board 348 for controlling the operation of, for example, the light deflector 56 and the laser beam source 51, by the electric source 346 may be positioned under the erasing light source 72. Reference numeral 398 denotes a guide member for guiding the sheet 22 fed to the case 25 and ejected therefrom.

Figure 32:
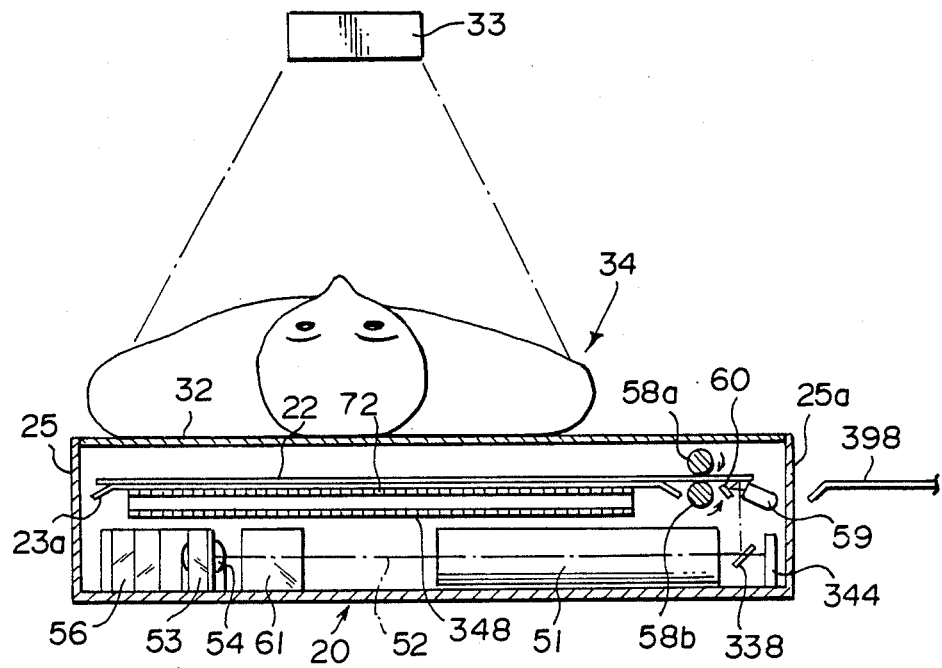
FIG. 32 is a fragmentary vertical sectional view showing the embodiment of FIG. 29.

In this embodiment, when the electric source 346 is turned on, the motor 318 is activated. In this condition, the sheet 22 is gripped at its holding portion 22c between the nip rollers 58a and 58b. As shown in FIG. 32, the nip rollers 58a and 58b are rotated in the directions as indicated by the arrows to convey the sheet 22 along the guide members 23a and 23b into the case 25. When the sheet 22 arrives at the inward ends of the guide members 23a and 23b, the motor 318 is stopped. As a result, the nip rollers 58a and 58b grip the holding portion 22a of the sheet 22. In this case, when an optical sensor or the like is positioned at the end of the guide member 23a or 23b it is possible to easily detect the arrival of the sheet 22 at the ends of the guide members 23a and 23b. In this condition, the radiation source 33 is activated to conduct image recording.

After the object 34 leaves the main body 20, the motor 314 is operated to rotate reversely, and the nip rollers 58a and 58b are thereby rotated reversely to the directions of the arrows. At this time, the laser beam source 51 is activated to conduct image read-out. As the sheet 22 is gradually conveyed in the sub-scanning direction towards the opening 25a by being gripped between the nip rollers 58a and 58b, the light emitted by the sheet 22 is detected by the photomultiplier 59. When the holding portion 22c of the sheet 22 arrives at the nip rollers 58a and 58b, the motor 318 is stopped. Thereafter, the motor 318 is again activated to rotate the nip rollers 58a and 58b in the directions as indicated by the arrows, and the sheet 22 projected out of the opening 25a is conveyed along the guide members 23a and 23b into the case 25. When the sheet 22 arrived at the inward ends of the guide members 23a and 23b, the motor 318 is stopped, and the sheet 22 is held at the predetermined position by the nip rollers 58a and 58b and the guide members 23a and 23b. The LEDs 321, 321, . . . of the erasing light source 72 are turned on to conduct erasing.

Since the LEDs emit light with high directivity, erasing may become nonuniform. In such a case, for example, the sheet 22 may be swung or vibrated by the nip rollers 58a and 58b to effect uniform erasing.

An embodiment of the radiation image storage panel in accordance with the present invention will hereinbelow be described with reference to FIGS. 33, 33A, 33B and 34.

Figure 33:
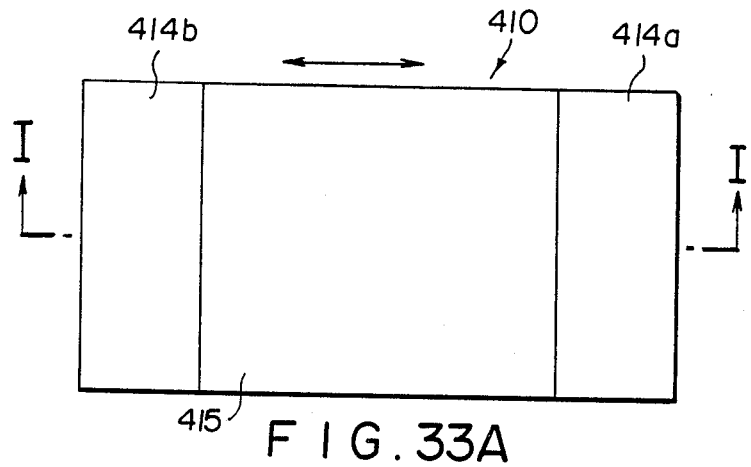
FIG. 33 is a plan view showing an embodiment of the radiation image storage panel in accordance with the present invention.
Figure 33A:
FIG. 33A is a sectional view taken along line I—I of FIG. 33.
Figure 33B:
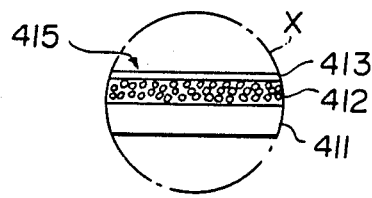
FIG. 33B is an enlarged view showing the portion in the circle X of FIG. 33A.

Referring to FIGS. 33, 33A and 33B, a radiation image storage panel 410 is constituted by a substrate 411, a stimulable phosphor layer 412 comprising a binder and a stimulable phosphor dispersed therein, and a protective film 413, which are overlaid in this order on the substrate 411. Extensions 414a and 414b are formed on opposite sides of an image forming region (the region of the stimulable phosphor layer 412) as viewed in the movement direction of the radiation image storage panel 410. The extensions 414a and 414b act as portions engaging with the conveyance means such as nip rolls when the radiation image storage panel 410 is moved by being grasped by the conveyance means.

The material of the extensions 414a and 44b may be selected from flexible resin materials which are used usually, for example, plastic materials such as polyamide, polyethylene, polypropyrene and polyvinyl chloride; synthetic rubber such as urethane rubber, silicone rubber, butyl rubber and chloroprene rubber; and natural rubber.

From the viewpoint of conveyability, strength or the like, the thicknesses of the extensions 414a and 414b should preferably be equal to or slightly smaller than the thickness of the radiation image storage panel 410. Since the extensions 414a and 414b must be flexible, the modulus of elasticity thereof should preferably be $4 \times 10^2$ kg/mm or less.

The length of each of the extensions 414a and 414b should preferably be not less than 0.1 times the length of the stimulable phosphor layer 412 in the movement direction of the radiation image storage panel 410, and more preferably be not less than 0.2 times the length of the stimulable phosphor layer 412 in said direction. When the lengths of the extensions 414a and 414b are adjusted to be comparatively long, it is possible to move the radiation image storage panel 410 smoothly and easily. Though the extension should preferably be provided at both the leading end portion and the rear end portion as viewed in the movement direction of the radiation image storage panel 410, the extension may be formed only at either one of the leading end portion and the rear end portion.

For forming the extension, a material molded to satisfy the aforesaid requirements may be secured to the leading end portion and/or the rear end portion of the panel by use of an adhesive. Or, said material may be secured in advance to the substrate by adhesion, and then the stimulable phosphor layer and the protective film may be formed. Alternatively, a long substrate may be formed, and the stimulable phosphor layer may be applied to the center of the substrate or to one side of the substrate.

An embodiment of the method of moving a radiation image storage panel in accordance with the present invention will now be described with reference to FIG. 34.

Figure 34:
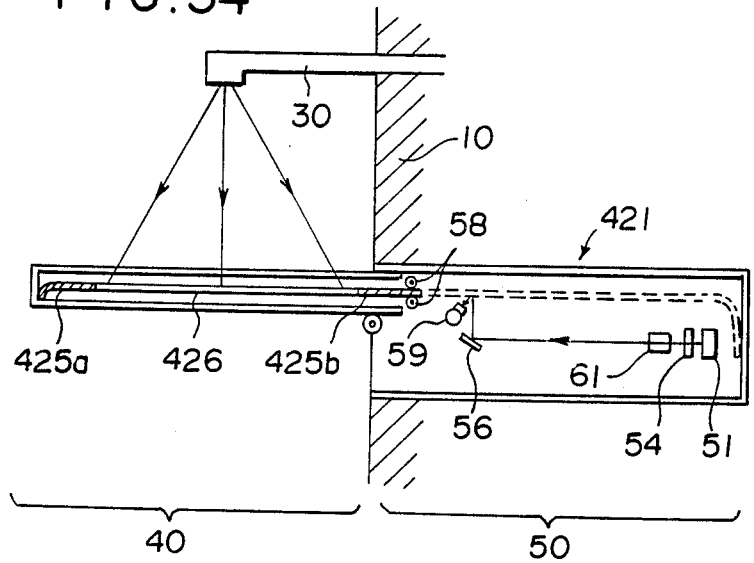
FIG. 34 is a schematic view showing the radiation image recording and read-out apparatus wherein the method of moving a radiation image storage panel in accordance with the present invention is employed.

In FIG. 34, a radiation image recording and readout apparatus 421 is embedded in the wall 10. The apparatus 421 comprises an image recording section 40 and an image readout section 50. When the image recording section 40 is not used, it is housed inside of the image read-out section 50. The radiation source housing section 30 is also housed inside of the wall 10 when it is not used.

A radiation image storage panel 426 provided with flexible extensions 425a and 425b in accordance with the present invention is positioned inside of the image recording section 40 so that the panel 426 is movable to right and left in FIG. 34. The right extension 425b of the radiation image storage panel 426 is grasped between a pair of nip rolls 58, 58 provided at the boundary between the image recording section 40 and the image read-out section 50. In this case, it is only necessary that at least a single pair of the nip rolls 58, 58 be provided so that the panel 426 is moved smoothly. For example, the rolls 58, 58 may be positioned in the vicinity of the forward end portion of the image recording section 40 or in the vicinity of the forward end portion of the image read-out section 50. It is also possible to provide multiple pairs of rolls close to each other or in spaced relation.

After the image recording is conducted, the nip rolls 58, 58 are rotated to move the radiation image storage panel 426 rightwardly until the stimulable phosphor layer of the panel 426 is entirely housed in the image read-out section 50 as indicated by the broken line in FIG. 34. Simultaneously with the rightward movement of the radiation image storage panel 426, the read-out mechanism of the image read-out section 50 is activated to conduct the image read-out while the panel 426 is moving rightwardly. Reference numeral 54' denotes a combination of a beam expander and a lens.

Near the end of the image read-out, the right end portion of the radiation image storage panel 426 strikes against the inner wall of the image read-out section 50. However, since the right end portion of the panel 426 is provided with the flexible extension 425b, the extension 425b is bent, normally downwardly, when it contacts the inner wall of the image read-out section 50. Therefore, no shock is generated by collision, and it becomes possible to omit the space for housing the extension 425b.

Thereafter, the radiation image storage panel 426 is moved leftwardly up to the position indicated by the solid line in FIG. 34, and operations are repeated in the same manner.

The substrate for the stimulable phosphor layer may be formed of cellulose acetate, a film of a plastic material such as polyethylene terephthalate, a metal sheet such as an aluminium foil, ordinary paper, Baryta paper, resin-coated paper, or the like. The surface of the substrate on which the stimulable phosphor layer is overlaid may be provided with a functional layer such as an adhesion imparting layer, a light reflection layer or a light absorbing layer.

The stimulable phosphor constituting the stimulable phosphor layer may be, for example, a bivalent europium activated alkaline earth metal fluorohalide phosphor represented by the formula $M^{II}FX:Eu^{2+}$ wherein $M^{II}$ is at least one alkaline earth metal selected from the group consisting of Mg, Ca and Ba, and X is at least one halogen selected from the group consisting of Cl, Br and I; a europium and samarium activated strontium sulfide phosphor represented by the formula $SrS:Eu,Sm$; a europium and samarium activated lanthanum oxysulfide phosphor represented by the formula $La_2O_2S:Eu,Sm$; a europium activated barium aluminum oxide phosphor represented by the formula $BaO.Al_2O_3:Eu$; a europium activated alkaline earth metal silicate phosphor represented by the formula $M^{2+}O \cdot SiO_2:Eu$ wherein $M^{2+}$ is at least one alkaline earth metal selected from the group consisting of Mg, Ca and Ba; a cerium activated rare earth element oxyhalide phosphor represented by the formula $LnOX:Ce$ wherein Ln is at least one rare earth element selected from the group consisting of La, Y, Gd and Lu, and X is at least one halogen selected from the group consisting of Cl, Br and I; or a bivalent europium activated alkaline earth metal halide phosphor represented by the formula $M^{II}XX':Eu^{2+}$ wherein $M^{II}$ is an alkaline earth metal, and each of X and X' is a halogen excluding fluorine.

The transparent protective film is overlaid on the stimulable phosphor layer for physically and chemically protecting the stimulable phosphor layer. The transparent protective film may be formed of, for example, cellulose acetate, polymethyl methacrylate, polyethylene terephthalate, or polyethylene. The thickness of the transparent protective film is usually within the range of approximately 0.1 $\mu$m to 20 $\mu$m.

The stimulable phosphor layer may be colored with pigments or dyes as disclosed in U.S. Pat. No. 4,394,581, or may be dispersed with white particles as disclosed in Japanese Unexamined Patent Publication No. 55(1980)-146447.

We claim:

1. A radiation image recording and read-out apparatus which comprises:

(i) a case housing a stimulable phosphor sheet for storing a radiation image thereon, and having an opening at one end portion, (ii) a light shielding cover housed in said case, said light shielding cover being movably supported for projection out of said case through said opening, said light shielding cover having a sheet passage opening at an end portion on a side thereof which is supported by said case when said light shielding cover is in a projected position out of said case, said sheet passage opening being in communication with an interior portion of said case when said light shielding cover is in a projected position said sheet passage opening permitting said stimulable phosphor sheet to pass between the inside of said light shielding cover and said case;

(iii) an image recording section for exposing said stimulable phsophor sheet, which is disposed at an exposure position inside of said light shielding cover when said light shielding cover is in a projected position out of said case, to a radiation carrying image information to have the radiation image stored on said stimulable phosphor sheet, (iv) an image read-out section having a sub-scanning means for moving said stimulable phosphor sheet between said exposure position and a position to which said stimulable phosphor sheet advanced out of said light shielding cover through said sheet passage opening into said case, and a main scanning means for scanning said stimulable phosphor sheet with stimulating rays in a main scanning direction in the vicinity of said opening of said case, said main scanning means being disposed inside of said case, wherein said stimulable phosphor sheet carrying said radiation image stored thereon is exposed to the stimulating rays which cause said stimulable phosphor sheet to emit light in proportion to the stored radiation energy, and the emitted light is read out by a photoelectric read-out means to obtain an image signal, and (v) an erasing section for releasing radiation energy remaining on said stimulable phosphor sheet, for which the image read-out has bene conducted at said image read-out section, before image recording is conducted on said stimulable phosphor sheet.

2. An apparatus as defined in claim 1 wherein said stimulable phosphor sheet comprises a substrate and a stimulable phosphor layer overlaid on said substrate and is positioned so that said stimulable phosphor sheet is exposed to said radiation from the substrate side in said light shielding cover, and said stimulable phosphor sheet is exposed to said stimulating rays from the stimulable phosphor layer side at said image read-out section.

3. An apparatus as defined in claim 1 wherein said stimulable phosphor sheet comprises a substrate and a stimulable phosphor layer overlaid on said substrate and is positioned so that said stimulable phosphor sheet is exposed to said radiation and said stimulating rays from the stimulable phosphor layer side at said image read-out section.

4. A radiation image recording and read-out apparatus which comprises:
  (i) a case housing a stimulable phosphor sheet for storing a radiation image thereon, and having an opening at one end portion,
  (ii) a light shielding cover housed in said case, said light shielding cover being movably supported for projection out of said case through said opening, said light shielding cover having a sheet passage opening at an end portion on a side thereof which is supported by said case when said light shielding cover is in a projected position out of said case, said sheet passage opening being in communication with an interior portion of said case when said light shielding cover is in a projected position,
  (iii) an image recording section for exposing said stimulable phosphor sheet, which is disposed at an exposure position inside of said light shielding cover when said light shielding cover is in a projected position out of said case, to a radiation carrying image information to have the radiation image stored on said stimulable phosphor sheet,
  (iv) an image read-out section having a subs-scanning means for moving said stimulable phosphor sheet between said exposure position and a position to which said stimulable phosphor sheet advances through said sheet passage opening into said case, and a main scanning means for scanning said stimulable phosphor sheet with stimulating rays in a main scanning direction in the vicinity of said opening of said case, said main scanning means being disposed inside of said case, wherein said stimulable phosphor sheet carrying said radiation image stored thereon is exposed to the stimulating rays which cause said stimulable phosphor sheet to emit light in proportion to the stored radiation energy, and the emitted light is read out by a photoelectric read-out means to obtain an image signal, and
  (v) an erasing section for releasing radiation energy remaining on said stimulable phosphor sheet, for which the image read-out has been conducted at said image read-out section, before image recording is conducted on said stimulable phosphor sheet, wherein said erasing section comprises an openable light shielding member provided at least on one side of said light shielding cover and opened to expose said stimulable phosphor sheet to external light for erasing.

5. A radiation image recording and read-out apparatus which comprises:
  (i) a case housing a stimulable phosphor sheet for storing a radiation image thereon, and provided with an opening for allowing passage of said stimulable phosphor sheet therethrough at one end portion, wherein said casing is dimensioned with a length and width substantially corresponding to the length and width of said stimulable phosphor sheet sized for the storage of a single image,
  (ii) an image recording section for exposing said stimulable phosphor sheet, which is disposed at an exposure position inside of said case, to a radiation carrying image information to have the radiation image stored on said stimulable phosphor sheet,
  (iii) an image read-out section provided with a sub-scanning means for moving said stimulable phosphor sheet between said exposure position and a position to which said stimulable phosphor sheet is projected out of said case through said opening, and a main scanning means for scanning said stimulable phosphor sheet with stimulating rays in a main scanning direction in the vicinity of said opening inside of said case, wherein said stimulable phosphor sheet carrying said radiation image stored thereon is exposed to the stimulating rays which cause said stimulable phosphor sheet to emit light in proportion to the stored radiation energy, and the emitted light is read out by a photoelectric read-out means to obtain an image signal, and
  (iv) an erasing section for releasing radiation energy remaining on said stimulable phosphor sheet, for which the image read-out has been conducted at said image read-out section, before image recording is conducted on said stimulable phosphor sheet.

6. An apparatus as defined in claim 5 wherein said stimulable phosphor sheet comprises a substrate and a stimulable phosphor layer overlaid on said substrate and is positioned so that said stimulable phosphor sheet is exposed to said radiation from the substrate side in said case, and said stimulable phosphor sheet is exposed to said stimulating rays from the stimulable phosphor layer side at said image read-out section.

7. A radiation image recording and read-out apparatus for positioning a stimulable phosphor sheet at an exposure position where said stimulable phosphor sheet is exposed to a radiation carrying image information, exposing said stimulable phosphor sheet to the radiation to have a radiation image stored thereon, reciprocably conveying said stimulable phosphor sheet in one direction from said exposure position, and reading out said radiation image stored on said stimulable phosphor sheet in the course of said reciprocable conveyance,
  wherein the improvement comprises constituting the conveyance means, which is used for conveying and positioning said stimulable phosphor sheet at said exposure position and then reciprocably conveying said stimulable phosphor sheet in one direction, by a pair of nip rollers; and
  said stimulable phosphor sheet having a holding portion at an end portion which is grasped between said pair of nip rollers for adjusting the position of said stimulable phosphor sheet.

8. An apparatus as defined in claim 7 wherein said pair of nip rollers are positioned to face an opening formed in a wall of a case of said apparatus for allowing passage of said stimulable phosphor sheet therethrough, and a guide member is positioned in the vicinity of said pair of nip rollers on the side opposite to said opening with respect to said pair of nip rollers in said case.

9. A radiation image storage panel comprising a substrate, and a stimulable phosphor layer overlaid on said substrate and containing a binder and a stimulable phosphor dispersed therein, wherein the improvement comprises the provision of a flexible extension formed of a flexible material at a leading end portion and/or a rear end portion as viewed in a movement direction of said radiation image storage panel.

10. A radiation image storage panel as defined in claim 9 wherein the modulus of elasticity of said extension is $4 \times 10^2$ kg/mm or less.

11. A radiation image storage panel as defined in claim 9 or 10 wherein the thickness of said radiation image storage panel including said extension is generally uniform.

12. A radiation image storage panel as defined in claim 9 or 10 wherein the length of said extension is not less than 0.1 times the length of said stimulable phosphor layer in the movement direction of said radiation image storage panel.

13. A radiation image storage panel as defined in claim 9 or 10 wherein said extension is formed of a synthetic resin sheet which does not have self-supporting property.

14. A method of moving a radiation image storage panel, which comprises the steps of:
(i) grasping a flexible extension of said radiation image storage panel by at least one pair of rolls, said radiation image storage panel comprising a substrate, and a stimulable phosphor layer overlaid on said substrate and containing a binder and a stimulable phosphor dispersed therein, and provided with said flexible extension formed of a flexible material at a leading end portion and/or a rear end portion as viewed in a movement direction of said radiation image storage panel, and
(ii) rotating said rolls to move said radiation image storage panel.

* * * * *